US009564010B2

(12) United States Patent
Page et al.

(10) Patent No.: US 9,564,010 B2
(45) **Date of Patent: *Feb. 7, 2017**

(54) VIRTUAL PLAYERS CARD

(71) Applicant: IGT, Las Vegas, NV (US)

(72) Inventors: Timothy Allan Page, Reno, NV (US); Christopher T. Lundy, Reno, NV (US); William R. Wells, Carson City, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,332

(22) Filed: Dec. 15, 2015

(65) Prior Publication Data

US 2016/0098899 A1 Apr. 7, 2016

Related U.S. Application Data

(63) Continuation of application No. 14/043,724, filed on Oct. 1, 2013, now Pat. No. 9,240,100, which is a (Continued)

(51) Int. Cl.
*G06F 17/00* (2006.01)
*G07F 17/32* (2006.01)
(Continued)

(52) U.S. Cl.
CPC ......... *G07F 17/3255* (2013.01); *G06Q 20/327* (2013.01); *G07F 9/026* (2013.01);
(Continued)

(58) Field of Classification Search
CPC .............. G07F 17/3255; G07F 17/3239; G07F 17/3241; G07F 17/32; G07F 9/026; G07F 17/3202; G07F 17/323; G07F 17/3223; G06Q 20/327
See application file for complete search history.

(56) References Cited

U.S. PATENT DOCUMENTS 5,091,713 A 2/1992 Horne et al.
5,259,613 A 11/1993 Marnell
(Continued)

FOREIGN PATENT DOCUMENTS

EP 0744786 A1 11/1996
EP 1074955 A2 2/2001
(Continued)

OTHER PUBLICATIONS

"20.3 Service Light Removal and Installation, Maintenance Procedures Game King Plus 19 Upright", International Game Technology. IGT Part No. 821-353-00., Oct. 1, 2001, 247-248.
(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

A gaming machine including a secondary processor coupled to a player tracking system for tracking game play of a patron using a virtual player loyalty card is described. A virtual player loyalty card can be created by associating an existing physical player loyalty card with a newly created mobile loyalty card account. The mobile card can be virtually inserted into an electronic gaming machine when a portable electronic device with an associated mobile application is in the vicinity of an electronic gaming machine. Once the mobile card is virtually inserted into the gaming machine, the patron's game play at the gaming machine can be tracked.

18 Claims, 18 Drawing Sheets

Related U.S. Application Data continuation-in-part of application No. 13/327,584, filed on Dec. 15, 2011, now Pat. No. 8,814,681, which is a continuation-in-part of application No. 12/943,789, filed on Nov. 10, 2010, now Pat. No. 8,088,014.

(60) Provisional application No. 61/708,495, filed on Oct. 1, 2012, provisional application No. 61/801,122, filed on Mar. 15, 2013, provisional application No. 61/303,106, filed on Feb. 10, 2010.

(51) Int. Cl.
*G07F 9/02* (2006.01)
*G06Q 20/32* (2012.01)

(52) U.S. Cl.
CPC .......... *G07F 17/32* (2013.01); *G07F 17/3202* (2013.01); *G07F 17/323* (2013.01); *G07F 17/3223* (2013.01); *G07F 17/3239* (2013.01); *G07F 17/3241* (2013.01)

(56) References Cited

U.S. PATENT DOCUMENTS 5,342,047 A 8/1994 Heidel et al.
5,412,404 A 5/1995 Candy
5,450,938 A 9/1995 Rademacher
5,531,309 A 7/1996 Kloss et al.
5,605,506 A 2/1997 Hoorn et al.
5,611,730 A 3/1997 Weiss
5,655,961 A 8/1997 Acres et al.
5,769,269 A 6/1998 Peters
5,844,808 A 12/1998 Konsmo et al.
5,908,354 A 6/1999 Okuniwicz
6,146,276 A 11/2000 Okuniewicz
6,249,885 B1 6/2001 Johnson et al.
6,286,756 B1 9/2001 Stinson et al.
6,354,749 B1 3/2002 Pfaffenberger, II
6,379,246 B1 4/2002 Dabrowski et al.
6,533,659 B2 3/2003 Seymour et al.
6,548,967 B1 4/2003 Dowling et al.
6,638,170 B1 10/2003 Crumby
6,846,238 B2 1/2005 Wells
6,854,645 B1 2/2005 Somers, Jr. et al.
6,897,624 B2 5/2005 Lys et al.
6,924,903 B2 8/2005 Brooks et al.
6,997,803 B2 * 2/2006 LeMay .................. G07F 17/32 463/20
7,014,563 B2 3/2006 Stephan et al.
7,051,221 B2 5/2006 Clabes et al.
7,099,035 B2 8/2006 Brooks et al.
D529,966 S 10/2006 LeSourd et al.
D536,389 S 2/2007 LeSourd et al.
D536,742 S 2/2007 Kaminkow et al.
7,178,941 B2 2/2007 Roberge et al.
7,202,613 B2 4/2007 Morgan et al.
7,213,812 B2 5/2007 Schubert et al.
7,270,605 B2 9/2007 Russell et al.
7,290,072 B2 10/2007 Quraishi et al.
7,309,965 B2 12/2007 Dowling et al.
7,311,598 B2 12/2007 Kaminkow et al.
7,311,604 B2 12/2007 Kaminkow et al.
7,385,359 B2 6/2008 Dowling et al.
7,390,257 B2 6/2008 Paulsen et al.
7,442,125 B2 10/2008 Paulsen et al.
7,529,868 B2 5/2009 Brooks et al.
7,550,931 B2 6/2009 Lys et al.
7,641,554 B2 1/2010 Paulsen et al.
7,642,730 B2 1/2010 Dowling et al.
7,646,029 B2 1/2010 Mueller et al.
7,689,167 B2 3/2010 Sengupta et al.
7,704,147 B2 4/2010 Quraishi et al.
7,764,026 B2 7/2010 Dowling et al.
7,803,053 B2 9/2010 Atkinson et al.
8,075,408 B2 12/2011 Hwang
8,083,592 B2 12/2011 Wells
8,088,014 B2 1/2012 Wells
8,241,123 B2 8/2012 Kelly et al.
8,241,124 B2 8/2012 Kelly et al.
8,371,937 B2 2/2013 Wells
8,460,091 B2 6/2013 Wells et al.
8,479,908 B2 7/2013 Wells et al.
8,579,711 B2 * 11/2013 Nguyen .................. G07F 17/32 463/16
8,616,968 B2 12/2013 Tripp
8,696,430 B2 4/2014 Wells
8,696,449 B2 4/2014 Wells
8,814,681 B2 8/2014 Wells et al.
8,814,706 B2 8/2014 Wells et al.
8,882,589 B2 11/2014 Wells
8,968,086 B2 3/2015 Wells et al.
9,022,861 B2 5/2015 Wells
9,240,100 B2 * 1/2016 Page .................. G07F 17/3239
2001/0036866 A1 11/2001 Stockdale et al.
2002/0016829 A1 2/2002 Defosse
2002/0115487 A1 8/2002 Wells
2002/0128932 A1 9/2002 Yung et al.
2002/0132663 A1 9/2002 Cumbers
2003/0054880 A1 3/2003 Lam et al.
2003/0074106 A1 4/2003 Butler
2003/0081824 A1 5/2003 Mennie
2003/0109302 A1 6/2003 Rist
2003/0109307 A1 6/2003 Boyd
2003/0190958 A1 10/2003 Paulsen
2003/0195037 A1 10/2003 Vuong et al.
2004/0014526 A1 1/2004 Kulas
2004/0043814 A1 * 3/2004 Angell ................ G07F 17/0014 463/25
2004/0082385 A1 4/2004 Silva et al.
2004/0132532 A1 7/2004 Brosnan et al.
2004/0146975 A1 7/2004 Yaver et al.
2004/0153748 A1 8/2004 Fabrizi et al.
2004/0166917 A1 8/2004 Lam et al.
2004/0166932 A1 8/2004 Lam et al.
2004/0171423 A1 9/2004 Silva et al.
2004/0238319 A1 12/2004 Hand
2004/0254006 A1 12/2004 Lam et al.
2004/0254013 A1 12/2004 Quraishi et al.
2005/0003890 A1 1/2005 Hedrick et al.
2005/0041161 A1 2/2005 Dowling et al.
2005/0043086 A1 2/2005 Schneider
2005/0061605 A1 3/2005 Bell et al.
2005/0099824 A1 5/2005 Dowling et al.
2005/0153776 A1 7/2005 LeMay et al.
2005/0159203 A1 * 7/2005 Bond .................. G07F 17/3202 463/16
2005/0184868 A1 8/2005 Mercado et al.
2005/0216120 A1 9/2005 Rosenberg et al.
2005/0248299 A1 11/2005 Chemel et al.
2005/0261057 A1 11/2005 Bleich et al.
2005/0275626 A1 12/2005 Mueller et al.
2005/0277471 A1 12/2005 Russell et al.
2005/0282631 A1 12/2005 Bonney et al.
2006/0035707 A1 2/2006 Nguyen et al.
2006/0046819 A1 * 3/2006 Nguyen .................. G07F 17/32 463/16
2006/0046849 A1 3/2006 Kovacs
2006/0063594 A1 3/2006 Benbrahim et al.
2006/0073869 A1 4/2006 LeMay et al.
2006/0073888 A1 * 4/2006 Nguyen .................. G07F 17/32 463/27
2006/0166741 A1 7/2006 Boyd et al.
2006/0178190 A9 8/2006 Okuniewicz
2006/0189391 A1 8/2006 Bird
2006/0217172 A1 9/2006 Roireau
2006/0219777 A1 10/2006 Aror et al.
2006/0221386 A1 10/2006 Brooks et al.
2006/0287095 A1 12/2006 Mattice et al.
2007/0010318 A1 1/2007 Rigsby et al.
2007/0021215 A1 1/2007 Russell et al.
2007/0050443 A1 3/2007 Ewing et al.
2007/0084978 A1 4/2007 Martin et al.
2007/0111796 A1 5/2007 Giaimo et al.
2007/0119681 A1 5/2007 Blake et al.

(56) References Cited

U.S. PATENT DOCUMENTS

2007/0123335 A1 5/2007 Okada
2007/0129136 A1 6/2007 Walker et al.
2007/0189026 A1 8/2007 Chemel et al.
2007/0243925 A1 10/2007 LeMay et al.
2007/0243934 A1 10/2007 Little et al.
2008/0020838 A1 1/2008 Slattery
2008/0039972 A1 2/2008 Walker
2008/0045345 A1 2/2008 Bird
2008/0076506 A1 3/2008 Nguyen et al.
2008/0076512 A1* 3/2008 Aida .................. G07F 17/3218 463/20
2008/0113767 A1 5/2008 Nguyen et al.
2008/0194329 A1 8/2008 Page et al.
2008/0207335 A1 8/2008 DiMichele
2008/0215391 A1 9/2008 Dowling et al.
2008/0242408 A1 10/2008 Hwang
2008/0274795 A1 11/2008 Carpenter et al.
2008/0293494 A1 11/2008 Adiraju et al.
2008/0300046 A1 12/2008 Gagner et al.
2008/0313636 A1 12/2008 Goldstein et al.
2009/0029770 A1 1/2009 Nagano
2009/0058884 A1 3/2009 Li
2009/0069094 A1 3/2009 Brosnan et al.
2009/0082079 A1 3/2009 Kuhn et al.
2009/0094081 A1 4/2009 Wittern et al.
2009/0098943 A1 4/2009 Weber et al.
2009/0104960 A1 4/2009 Kelly et al.
2009/0124329 A1 5/2009 Palmisano
2009/0137318 A1 5/2009 Russo et al.
2009/0138638 A1 5/2009 Russo et al.
2009/0149253 A1 6/2009 Kelly et al.
2009/0149261 A1 6/2009 Chen et al.
2009/0172980 A1 7/2009 Heather et al.
2009/0174346 A1 7/2009 Hwang et al.
2009/0197673 A1 8/2009 Bone et al.
2009/0233705 A1 9/2009 LeMay et al.
2009/0247281 A1 10/2009 Voutes
2009/0270159 A1 10/2009 Kato et al.
2009/0270167 A1 10/2009 Ajiro et al.
2009/0276640 A1 11/2009 Wu
2009/0294243 A1 12/2009 Charych et al.
2009/0307505 A1 12/2009 Robertson et al.
2009/0325686 A1 12/2009 Davis et al.
2010/0016073 A1 1/2010 Goldstein et al.
2010/0020546 A1 1/2010 Kukita
2010/0075753 A1 3/2010 Atkinson
2010/0081500 A1 4/2010 Phillips et al.
2010/0105454 A1 4/2010 Weber et al.
2010/0120518 A1 5/2010 Borissov et al.
2010/0124983 A1* 5/2010 Gowin ................ G07F 17/3223 463/25
2010/0124990 A1 5/2010 Crowder
2010/0127634 A1 5/2010 Dowling et al.
2010/0130278 A1 5/2010 Shimabukuro
2010/0130284 A1 5/2010 Luciano, Jr. et al.
2010/0197404 A1 8/2010 Lum et al.
2010/0203961 A1 8/2010 Burke et al.
2010/0255902 A1 10/2010 Goldstein et al.
2010/0285866 A1 11/2010 Bleich et al.
2011/0032070 A1 2/2011 Bleile
2011/0207530 A1 8/2011 Chudek et al.
2011/0314153 A1* 12/2011 Bathiche ................. H04L 63/08 709/225
2012/0122584 A1 5/2012 Nguyen
2012/0142403 A1 6/2012 Prather et al.
2012/0142412 A1* 6/2012 Carson, Jr. .............. G07F 17/32 463/25
2013/0084951 A1* 4/2013 Davis .................. G07F 17/3248 463/25
2013/0130790 A1 5/2013 Wells
2013/0137510 A1* 5/2013 Weber ................. G07F 17/3227 463/29
2013/0225279 A1* 8/2013 Patceg ................ G07F 17/3204 463/29
2013/0244756 A1 9/2013 Wells
2013/0252712 A1 9/2013 Wells et al.
2013/0275308 A1* 10/2013 Paraskeva .............. G06Q 20/32 705/71
2014/0031119 A1 1/2014 Wells et al.
2014/0031125 A1 1/2014 Wells et al.
2014/0087849 A1 3/2014 Page et al.
2014/0094272 A1* 4/2014 Kelly .................. G07F 17/3225 463/25
2014/0110468 A1* 4/2014 Kandregula ....... G06Q 30/0241 235/375
2014/0200067 A1 7/2014 Wells
2014/0315620 A1 10/2014 Wells
2015/0141132 A1 5/2015 Wells et al.
2015/0243122 A1 8/2015 Saffari et al.

FOREIGN PATENT DOCUMENTS

EP 2009602 A2 12/2008
JP 56168275 A 12/1981
WO WO97/27576 7/1997
WO WO2007/146316 A2 12/2007

OTHER PUBLICATIONS

U.S. Appl. No. 13/327,584, Final Office Action mailed Dec. 26, 2013, 21 pgs.
U.S. Appl. No. 13/327,584, Notice of Allowance mailed May 16, 2014, 8 pgs.
U.S. Appl. No. 13/738,774, Non Final Office Action mailed Jul. 19, 2013, 10 pgs.
U.S. Appl. No. 13/738,774, Notice of Allowance mailed Jan. 14, 2014, 8 pgs.
U.S. Appl. No. 13/890,285, Non Final Office Action mailed Sep. 25, 2013, 18 pgs.
U.S. Appl. No. 13/890,692, Non Final Office Action mailed Sep. 10, 2013, 6 pgs.
U.S. Appl. No. 13/890,692, Notice of Allowance mailed Dec. 18, 2013, 6 pgs.
U.S. Appl. No. 14/027,111, Non Final Office Action mailed Feb. 14, 2014, 16 pgs.
U.S. Appl. No. 14/027,111, Notice of Allowance mailed Jun. 6, 2014, 8 pgs.
U.S. Appl. No. 14/027,112, Non Final Office Action mailed Sep. 4, 2014, 6 pgs.
U.S. Appl. No. 14/027,112, Notice of Allowance mailed Oct. 27, 2014, 8 pgs.
U.S. Appl. No. 14/043,724, Non Final Office Action mailed Dec. 26, 2014, 11 pgs.
U.S. Appl. No. 14/043,724, Notice of Allowance mailed Sep. 14, 2015, 10 pgs.
U.S. Appl. No. 14/207,476, Non Final Office Action mailed Jun. Jun. 13, 2014, 5 pgs.
U.S. Appl. No. 14/207,476, Notice of Allowance mailed Jul. 22, 2014, 5 pgs.
U.S. Appl. No. 14/320,250, Non Final Office Action mailed Nov. 28, 2014, 5 pgs.
U.S. Appl. No. 14/320,250, Notice of Allowance mailed Jan. 22, 2015, 5 pgs.
U.S. Appl. No. 14/710,549, Notice of Allowance mailed Oct. 27, 2015, 10 pgs.
"International Application Serial No. PCT/US2010/059551, International Search Report dated Jun. 22, 2011", Jun. 22, 2011, 9 pgs.
"International Application Serial No. PCT/US2010/059551, Written Opinion dated Jun. 22, 2011", Jun. 22, 2011, 17 pgs.
"U.S. Appl. No. 13/300,344, Office Action mailed Jun. 12, 2012", Jun. 12, 2012, 42 pgs.
"U.S. Appl. No. 12/943,798, Office Action mailed Sep. 6, 2011", Sep. 6, 2011, 23 pgs.
"U.S. Appl. No. 12/943,789, Notice of Allowance mailed Oct. 17, 2011", Oct. 17, 2011, 8 pgs.
"U.S. Appl. No. 12/943,789, Office Action mailed May 23, 2011", May 23, 2011, 22 pgs.

(56) References Cited

OTHER PUBLICATIONS

"U.S. Appl. No. 12/943,792, Notice of Allowance mailed Oct. 18, 2011", Oct. 18, 2011, 8 pgs.
"U.S. Appl. No. 12/943,792, Office Action mailed Jun. 15, 2011", Jun. 15, 2011, 24 pgs.
"U.S. Appl. No. 12/943,797, Office Action mailed Feb. 1, 2012", Feb. 1, 2012, 21 pgs.
"U.S. Appl. No. 12/943,798, Final Office Action mailed Jan. 31, 2012", Jan. 31, 2012, 17 pgs.
"U.S. Appl. No. 12/943,798, Office Action mailed Jun. 7, 2012", Jun. 7, 2012, 30 pgs.
"U.S. Appl. No. 12/943,802, Final Office Action mailed Oct. 26, 2011", Oct. 26, 2011, 35 pgs.
"U.S. Appl. No. 12/943,802, Office Action mailed Jul. 28, 2011", Jul. 28, 2011, 20 pgs.
"U.S. Appl. No. 13/086,218, Office Action mailed Jul. 31, 2012", Jul. 31, 2012, 34 pgs.
"U.S. Appl. No. 13/294,064, Notice of Allowance mailed Sep. 10, 2012", Sep. 10, 2012, 9 pgs.
"U.S. Appl. No. 13/294,064, Office Action mailed May 21, 2012", May 21, 2012, 18 pgs.
"U.S. Appl. No. 13/300,344, Notice of Allowance mailed Dec. 11, 2012", Dec. 11, 2012, 10 pgs.

* cited by examiner 800
700
Bill Validator 426
18
2
Display 802
706
708
710
818
714
712
702
Gaming Authorization Terminal 804
Power Supply 806
716
718
720
722
724
726
728
Slot Machine Interface Board 810
Interface 808
EGM SAS OUT 812
Card Reader 412
Power Reset 414
Printer 416
Interface 814
EGM Audio Amp 816
EGM controller 424

VIRTUAL PLAYERS CARD

CROSS REFERENCE TO RELATED APPLICATIONS

This patent application is a continuation of U.S. patent application Ser. No. 14/043,724, filed Oct. 1, 2013, entitled, "Virtual Players Card," by Page et al., which claims priority under 35 U.S.C. §119(e) to U.S. Provisional Patent Application No. 61/708,495, filed Oct. 1, 2012, entitled "Virtual Players Card," by Page et al., which is incorporated by reference in its entirety for all purposes herein. U.S. patent application Ser. No. 14/043,724 claims priority under 35 U.S.C. §119(e) to U.S. Provisional Patent Application No. 61/801,122, filed Mar. 15, 2013, entitled "Methods and Apparatus for Retrofitting Gaming Machines," by Wells et al., which is incorporated by reference in its entirety for all purposes herein. U.S. patent application Ser. No. 14/043,724 claims priority under 35 U.S.C. §120 and is a continuation-in-part of U.S. patent application Ser. No. 13/327,584, "Candle Device for Generating Display Interfaces on the Main Display of a Gaming Machine," filed Dec. 15, 2011, by Wells, et al., which claims priority to U.S. patent application Ser. No. 12/943,789, entitled, "Gaming Device and Method for Wireless Gaming System Providing Non-Intrusive Processes," by Wells, filed Nov. 10, 2010, which claims priority under 35 U.S.C. §119(e) to U.S. Provisional Patent Application Ser. No. 61/303,106 entitled "Gaming Device and Method for Wireless Gaming System Providing Non-Intrusive Processes" by Wells, filed Feb. 10, 2010 each of which are incorporated by reference in their entirety and for all purposes.

BACKGROUND

Field of the Invention

The invention relates to gaming devices that provide communication capabilities and enhanced gaming functions on an electronic gaming machine.

Description of the Related Art

Casinos derive a large portion of their revenues from electronic gaming machines, including mechanical and video slot machines. The operating costs associated with maintaining electronic gaming machines is an important factor to casino operators. To maximize their profitability, casino operators wish to minimize the electronic gaming machine operating costs.

A significant component of the operating costs is related to the performance of maintenance operations requiring access to the interior of a gaming machine. For instance, access to the interior of the gaming machine is needed to periodically remove cash from the gaming machine, such as coins in a drop box or bills stored in a bill stacker. As another example, access to the interior of the gaming machine is needed to periodically replenish paper used to print ticket vouchers for cashless gaming applications.

For security and regulatory purposes, electronic gaming machines include a number of locked enclosures that are monitored by an internal security system. The locked enclosures and security system help to prevent unauthorized access to resources within the electronic gaming machine that may be targets of theft or tampering, such as deposited money or gaming software. To address a maintenance issue that requires access to interior portions of the gaming machine, often two or more keys carried by separate individuals can be required. During the performance of the maintenance operation in the interior, one individual not performing the maintenance may be required to watch the other individual performing the maintenance operation. Thus, a significant contributor to the gaming machine operating costs is labor costs associated with maintenance.

In addition to labor costs, while the gaming machine is being maintained it is not available for game play. Thus, revenue is lost which also contributes to the operating costs. Further, some maintenance operations, such as replenishing blank tickets that can be used to print redeemable ticket vouchers involve material costs. Thus, some maintenance operations contribute both material costs and labor costs to the gaming machine operating costs.

Balanced against minimizing operating costs are providing functions that make the machines more convenient for a player to use and encourage repeated use of the machines. For instance, a bill validator on a gaming machine is not required and its use increases gaming machine operating costs. However, the availability of a bill validator makes a gaming machine more convenient for a player to use which outweighs the additional operating costs associated with the bill validator. As another example, loyalty programs and associated hardware that allow for player rewards and a personalization of a gaming session increases operating costs. Nevertheless, it has been found that these features make a game play session more satisfying to players such that the average amount of game play or the amount of repeat business from a typical player is increased. The increase in game play or repeat business outweighs the operating costs associated with providing these features.

Thus, in view of the above, apparatus and method are desired that either reduce gaming machine operating costs or provide new features with benefits to players that outweigh the additional operation costs associated with providing the new features.

SUMMARY

Broadly speaking, the embodiments disclosed herein describe relate to providing enhanced gaming functionality to wagered-based gaming devices, such as but not limited to mechanical slot reel or video slot machines. In particular, the embodiments can be used on gaming devices that execute regulated gaming software to control a play of a wager-based game on the gaming device. A game controller on the gaming device can execute the regulated gaming software. In one embodiment, the enhanced gaming functionality can be generated using a secondary processor disposed within the cabinet of the gaming device or within a candle device. The candle device can be mounted to an exterior surface, such as the top portion, of a gaming machine cabinet. In particular embodiments, the enhanced gaming functionality can be generated without modifying the regulating gaming software executed on the electronic gaming machine.

According to an embodiment, an electronic wager-based gaming machine is provided. The gaming machine includes a game controller, a secondary processor for communicating with a remote server, a card reader, and a spoofing device. The spoofing device is operably connected to the card reader and a patron management system external to the gaming machine. The spoofing device can send a signal to the patron management system indicating that a physical loyalty card is inserted into the card reader when a mobile loyalty card is virtually inserted into the gaming machine without a physical loyalty card being inserted into the card reader.

According to another embodiment, a method is provided for tracking game play of a wager-based game on an electronic gaming machine using a virtual mobile loyalty card. A mobile loyalty card virtually inserted into the electronic gaming machine is recognized. The mobile loyalty card is virtually inserted after the portable electronic device scans a QR code, or some other type of optically formatted data, displayed on the electronic gaming machine. The virtually inserted mobile loyalty card is then associated with a patron's data stored in a remote database. Game play at the electronic gaming machine can then be tracked and associated with the mobile loyalty card.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
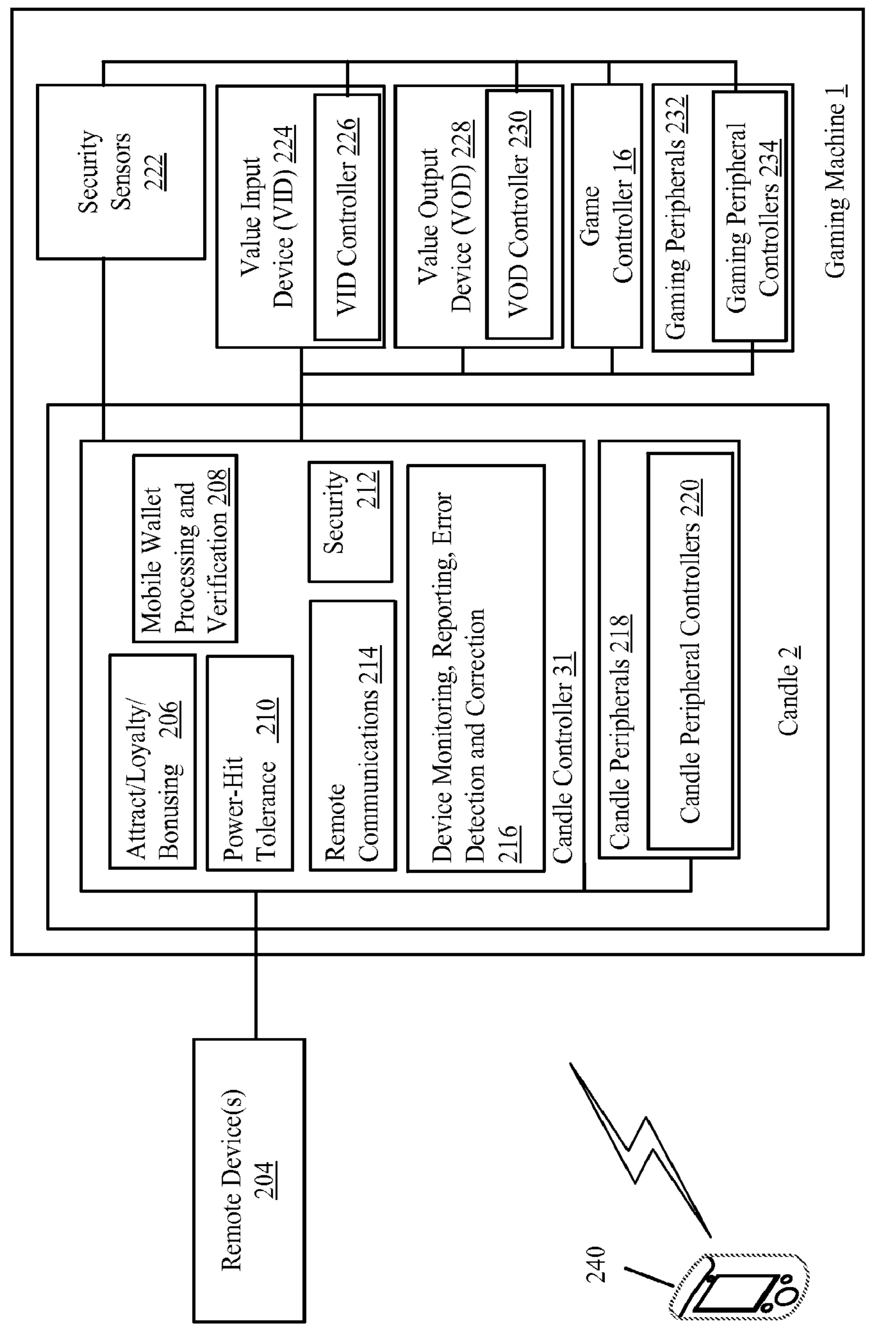
FIG. 1 is a block diagram of a gaming machine including a candle device in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Typically, electronic gaming machines can be provided with a game controller and a number of peripheral devices coupled to the game controller, such as monitors, printers, bill/ticket acceptors, lights and bonus mechanisms. The game controller can be configured to control the play of a wager-based game on the gaming machine including determining game outcomes using a random number generator and interacting with the peripheral devices to present the determined game outcome to a user of the gaming machine. The interactions between the game controller and the peripheral devices can involve sending commands and/or data to the peripheral devices and receiving status information from the peripheral device.

Because regulatory regulations can require a long and expensive approval process for introducing new game software, the gaming software used by the game controller to provide a wager-based game on the gaming machine is rarely updated once the gaming machine is deployed in the field, such as within a casino. Thus, once deployed, the functionality of the game controller is fixed and the game controller may not recognize the introduction of new devices and new features. However, it can be desirable to provide upgrade capabilities in a gaming machine so that new features and functions can be introduced.

One approach to providing upgrade capabilities is to assume the gaming software on the game controller will be fixed and provide a secondary processor that is separate from the game controller. The software of the secondary processor can be upgraded to add additional gaming functions. In one embodiment, the secondary processor can be configured so that it does not perform wager-based game functions, such as the determination of an outcome for the wager-based game and an associated award. Since the secondary processor does not perform gaming functions, the software approval process for a device including the secondary processor can be greatly simplified.

In particular embodiments, the secondary processor can be installed in an electronic gaming machine (EGM) or electronic gaming table (EGT) at the time of manufacture. In other embodiments, the secondary processor can be installed in an EGM or EGT after it is deployed in the field as part of a retrofit process. As described above, the secondary processor can be used to generate new gaming functions on an on-going basis. Each time a new gaming function is introduced, the secondary processor can be configured to implement the new gaming function without modifying the regulated gaming software executed by the game controller on an EGM or EGT prior to the introduction of the new gaming function.

Peripheral devices, such as bill validators and printers, also run regulated gaming software. In some embodiments, new gaming functions can be introduced using a secondary processor where the new gaming functions are associated with one or more peripheral devices. For example, new gaming functions can involve communications between one or more peripheral devices and the secondary processor where the communications can include the one or more peripheral devices receiving commands from the secondary processor. In some instances, the introduction of the new gaming functions may require modification and re-approval of the regulated game software on one or more of the peripheral devices. In other embodiments, a new gaming function can be introduced without modifying the regulated game software existing on the game controller and existing one or more of the peripheral devices prior to the introduction of the new gaming function.

In some of the embodiments described herein, the secondary processor can be incorporated into a candle device. In other embodiments, a secondary processor is included in the cabinet of the gaming machine. In yet other embodiments, multiple secondary processors can be utilized in combination with one another, such as a secondary processor on a candle device and a secondary processor in a gaming device installed within a cabinet of the EGM. The functions attributed to one gaming device, such as a candle device including a secondary processor, are described for the purposes of illustration only as other gaming devices including a secondary processor can perform the functions in lieu of the candle device or in combination with the candle device. For example, in one embodiment, a secondary processor on the candle device can be used to control a wireless interface which allows communications with a mobile device, such as a smart phone, near an EGM or EGT. In another embodiment, a secondary device on a gaming device installed within the cabinet of an EGM or EGT can control the wireless interface to provide this functionality.

A candle device is typically mounted to the top cabinet of a gaming machine for maximum visibility. It includes a number of stages of different colors that can be lit alone or in combination with other stages to convey information about a state of a gaming machine. For instance, often a candle device is configured to light up a stage of a particular color when an attendant is needed at the gaming machine. Traditional candle devices include a simple controller for turning on-off different lighting stages in response to commands from a game controller. However, a secondary processor and memory can be added to the candle device to greatly increase the functions that the candle device can perform. For instance, the secondary processor can control additional peripheral devices, such as audio devices, image capture devices and display devices, integrated into the candle device as well as peripheral devices, such as bill validators, printers, displays and audio devices integrated into the main cabinet of a gaming machine. The peripheral devices can be controlled to add additional functionality to the gaming machine. In addition, the secondary processor can be used to provide enhanced communication functionality, such as wireless communications between the gaming machine and remote servers or wireless communications with portable electronic devices carried by casino employees and patrons alike.

In particular embodiments, some of the peripheral devices can be dual port devices where a first port is communicatively coupled to the game controller and a second port is communicatively coupled to the secondary processor. In one embodiment, the main touch screen display of the gaming machine that is used to output the wager-based game can be a dual port device. The game controller can be configured to send video content to the main display that allows a wager-based game to be played on the gaming machine via the first port. The secondary processor can be coupled to the main display and configured to send supplementary video content to the main display via the second port. The secondary processor can also be configured to control a size and position of a portion of the display allocated to showing the video content from the game controller and a size and position of a portion of the display allocated to showing video content from the candle device. The video content from the candle device that is output to the main display under control of the secondary processor can be used to provide additional features to the gaming machine.

In an alternate embodiment, the game controller and the secondary processor can share a single port into a device, such as a display or a bill validator. In some instances, the secondary processor can be disposed between game controller and the single port into the device such that the secondary processor can receive communications output from the single port to another device, such as game controller, and receive communications to the single port from another device, such as the game controller. The secondary processor can be configured to let the communications pass through without modification or can be configured to modify the communications in some manner before it is allowed to reach its target destination.

In one embodiment, the secondary processor can be used to generate an interface on the main display that can enable verification of an electronic transaction involving an interaction between a gaming machine and a portable electronic device, such as a smart phone, carried by a player. As an example, the electronic transaction may involve an electronic transfer of funds to the gaming machine. In particular embodiments, sound and wireless communication capabilities can be provided with a candle device 2. Alternatively, the candle can be configured to control a remote audio device, such as speakers mounted to a gaming machine cabinet. In one embodiment, the remote audio device can also be configured to be controlled by a gaming controller.

One or more antennas for receiving and transmitting wireless communication, such as for communication via Bluetooth™ or Wi-Fi™ related communication protocols, can be integrated into the candle device. In general, one or more antennas can be provided at different locations within the candle device. In other embodiments, one or more antennas can be provided at different locations on or within the electronic gaming machine.

The candle device can include one or more image capture devices, such as camera. The image capture devices can be configured to capture still images or video data. Multiple image capture devices can be used to increase a field of view relative to the candle. In one embodiment, multiple image capture devices can be used to provide a 360 degree view around the candle. In other embodiments, a number of image capture device can be primarily orientated in a direction towards the front of a gaming machine to capture the activity of a person in front of the gaming machine and possibly on adjacent gaming machines.

In alternate embodiments, the candle device can be coupled to a remote image capture device. For instance, image capture device can be mounted to a player tracking unit installed within a gaming machine cabinet, a card reader installed within the gaming machine cabinet or at some other location on the gaming machine cabinet, such as within a top box. A wired or wireless communication connection can be implemented between a controller within the candle device and the image capture device. In one embodiment, the image capture device can be used in conjunction with the image capture device located within the candle device. In another embodiment, the image capture device can replace the image candle device such that the candle device no longer includes a camera mounted within its housing.

In one embodiment, all of the communication channels routed through the candle interface with a communication controller. The communication channels can be associated with pass through communications, such as communications from an external device routed to the gaming machine via the candle or communications generated at the game controller, player tracking controller or a peripheral device and sent to a remote device via the candle. For instance, pass through communication can include a communication from a game controller on a gaming machine to a remote server that is passed through the candle to allow the communications to be transmitted wirelessly to the remote sever. As described above, the candle can be configured to engage in bi-directional communications with various devices on a gaming machine (e.g., see FIGS. 1 and 2 and their associated description).

These communications channels may support various communication protocols. Thus, the processor can be configured to parse and generate messages associated with various communication protocols. For instance, the communication channels can be used to implement one or more of Ethernet, I2C, RS-232 and/or USB. Other communication protocols that may be used are RS-485, IEEE 1394 (Firewire), Netplex and other standard or proprietary communication interfaces used in the gaming industry as well as the computing industry. If available, these channels can be implemented as wired or wireless embodiments. For instance, a wireless communication protocol, such as wireless USB, can be implemented to allow for wireless communications between the candle and other devices within the gaming machine. Besides wireless communications, wireless power transmission may also be supported in candle.

In an alternate embodiment, a cabinet module can be provided that includes a number of connection interfaces, such as connection interfaces for power, candle inputs, Ethernet, the I2C, the RS-232 and USB. In operation, the cabinet module can be disposed within the cabinet of a device, such as a cabinet of a gaming machine. The cabinet module can include one or more processors and memory in addition to processors that are located in a secure enclosure in the external portion of the candle device. The functions described with respect to the candle controller can be distributed between processors located in the external portion of the candle device and processors located in the cabinet module. In one embodiment, the secure enclosure in the external portion of the candle device can at least include a processor for performing wireless functions associated with the candle device.

In a particular embodiment, the processor in the cabinet module can be coupled to a memory storage device within the cabinet module. In one embodiment, the memory storage device can be a solid state drive. The processor can be configured to only write data to the memory storage device if it is received from a remote server via the wireless communication connection from the external portion of the candle device or an Ethernet port. The Ethernet port allows the processor to communicate with a remote server via a wired Ethernet connection.

Further, the processor in the cabinet module can be configured to only copy data from the memory storage device and send it to the remote server via the wireless interface and/or the Ethernet connection. If an attempt is made to copy data from the memory storage device or write data to the memory storage device, via an alternate communication port, such as the USB or RS-232 port, the processor can be configured to perform a remedial action that prevents copying data from or writing to the memory storage device. For example, the processor can be configured to reboot the candle device in response to detecting a copy or write to the memory storage device via an unauthorized port. The reboot can be triggered as long as a device is attempting to copy or write from the unauthorized communication port.

For example, if a USB dongle is connected to the USB port an attempt is made to write data from the dongle to the memory storage device or an attempt is made to copy data from the memory storage device. The processor in the cabinet module can be configured to cause the candle device to repeatedly reboot as long as the USB dongle remains coupled to the USB port and are attempting to write or copy data from the memory storage device. When the device is removed, the candle device can finish the boot condition and return to a regular operating condition. However, it can be configured to report the attempt to a remote device, such as a remote server that communicates with the candle device wirelessly when communications are restored with the remote device.

As another security feature, the processor in the cabinet module can be configured to constantly maintain communications with one or more processors in the externally mounted candle device. When the processor in the candle device can't be detected by the processor in the cabinet module, the processor can be configured to trigger an error condition. The error condition might trigger a remedial action, such as shutting down or rebooting the candle device. When remote communications are restored to the processor in the cabinet module, such as via a wireless communication connection, then the processor in the cabinet module can report the error condition to a remote server.

In addition, a remote server can also be configured to constantly maintain communication with one or more processors in the externally mounted candle device and/or the processor in the cabinet module. If the processor in the externally mounted portion of the candle device cannot be detected and/or the processor in the cabinet module cannot be detected by the remote server, then the remote server can log an error condition and trigger a remedial action. For instance, when a processor in the external or internal portion of the cabinet device can't be detected, the remote server can be configured to send a message to a security person to investigate the gaming machine including the candle device with the cabinet module.

Figure 2:
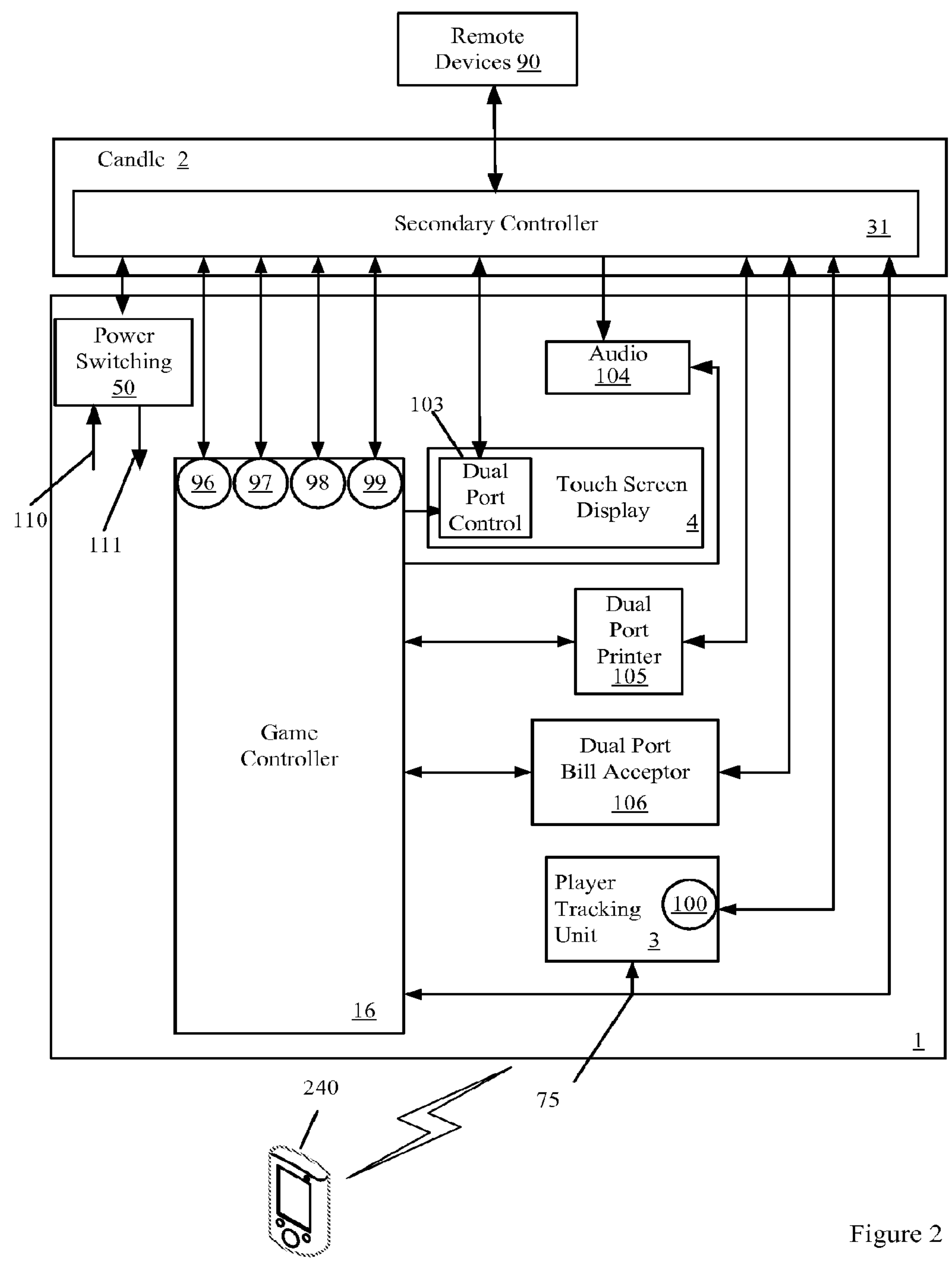
FIG. 2 is a block diagram of a gaming machine including dual port devices communicatively coupled to a candle device in accordance with the described embodiments.

With respect to FIGS. 1 and 2, details of electronic gaming machines including the candle devices described above and interactions between the candle device and various gaming machine components are presented. As described above, a gaming device other than a candle device, such as a gaming device installed in a cabinet of the EGM can be used to interact in a manner attributed to the candle device. Thus, the candle device is depicted for the purposes of illustration and is not meant to be limiting.

FIG. 1 is a block diagram of a gaming machine 1 including a candle device 2 in accordance with some of the described embodiments. The candle 2 can be configured to communicate with one or more remote devices, such as 204, mobile devices, such as 240, and devices associated with the gaming machine 1, such as the game controller 16, security sensors 222, a value input device 224, a value output device 228 and other gaming peripherals 232. The candle 2 can include a candle controller 31 for controlling the communications with the various devices. The candle controller 31 can include one or more processors and memory.

A number of peripheral devices 218, such as but not limited displays, audio devices, cameras and lighting arrays can be associated with the candle 2. The candle controller 31 can be configured to control the peripherals 218 via communications with peripheral controllers 220 associated with each peripheral. In particular embodiments, the controller 31 can be configured to the control the peripherals in conjunction with commands and/or data received from one or more remote devices, such as 204. For instance, the remote server 204 can send a message to the controller 31 for output to a display associated with the candle 2.

The candle controller 31 can include a processor and memory that is programmable to perform various functions. The functions can be related but are not limited to 1) security 212, 2) device monitoring, reporting, error detection and correction 216, 3) remote communications 214, 4) attract, customer loyalty programs and bonusing 206 and 5) power-hit tolerance 210. In various embodiments, the functions provided by the controller 31 can be modified or changed in response to receiving a download of software and/or firmware from a remote device.

The controller 31 can be configured to communicate with a value input device (VID) 224 via its VID controller 226 and a value output device (VOD) 228 via its VOD controller 230. The value input devices 224 and the value output devices 228 are gaming peripherals that are used to add or remove value from the gaming machine 1. Via a VID, value can be added to the gaming machine to allow wagers to be mad on a wager-based game. Via a VOD, any value remaining on the gaming machine 1 can be removed, such as value accrued via successful wagers, can be removed.

The security functions 212 can be related to monitoring security devices associated with just the candle such as security sensors associated with a secure enclosure and/or cameras located on the candle 2. Further, the candle controller can be configured to monitor security sensors associated with the gaming machine 1, such as sensors 222 associated with locks on the gaming machine 2. As described above, the remote communications 214 can involve sending communications from the candle 2 to remote devices. In a particular embodiment, the communications can be sent via a wireless communication interface.

The attract and bonusing features 206 can involve performing functions associated with a loyalty program, such as player tracking program. In particular embodiments, the controller 31 can be configured to perform functions often associated with a player tracking unit, such as associating game play on the gaming machine with a particular player, receiving and displaying player identification information and transferring free play credits to the gaming machine 1. In general, a secondary processor, such as the controller 31, can provide access to games in conjunction with or independent from a game generated by the game controller. In one embodiment, the secondary processor can generate games on which wagers can be made where the outcome of the game is output to an EGM or EGT. Alternatively, as described in more detail below, player tracking functions can be performed by a secondary processor located in the cabinet of the gaming machine 1.

The power-hit tolerance 210 can be used to preserve data in the event of a loss of power or a power fluctuation on the gaming machine 2. As described above with respect to FIG. 4, the controller 31 can include a back-up power source. In the event of a power failure, the controller can be configured to operate with some data storage and communication capabilities using the back-up power source until power is restored to the gaming machine 1. As an example, the power-hit tolerance function can be used to preserve data generated from one or more the gaming peripherals 232, a value input device 224 or a value output device 228.

The device monitoring, reporting, error detection and correction 216 can be associated with managing maintenance issues associated with peripheral devices, such as a VID 224 or a VOD 228. Currently, unless an error condition that requires a technician to intervene occurs, maintenance schedules on VIDs and VODs on a gaming machine 1 are usually based on average reliability predictions, i.e., every device is treated the same. Therefore, some devices can be scheduled for maintenance when they do not need it while other devices may not receive maintenance when it is needed. Maintenance of VIDs and VODs can be labor intensive, which is costly to operators. Further, while a device is being maintained, revenues are not generated on the gaming machine 1, which is also costly. Therefore, scheduling a device for maintenance that does not need it is costly to operators. However, not providing maintenance to device that needs it can also be costly. The device monitoring, reporting, error detection and correction 216 can be configured to provide better maintenance scheduling for devices, such as 224 and 228, on the gaming machine 1.

Examples of value input devices can include but are not limited to bill and ticket acceptors, coin acceptors and card readers. Via one or more of the VIDs, a value amount associated with a bill, ticket, coin, a card or an electronic wallet carried by the player can be added to the gaming machine. Examples of value output devices can include but are not limited to ticket printers, card writers and coin dispensers. Via one or more of the VODs, a value amount can be removed from the gaming machine 1. For instance, a value amount removed from the gaming machine 1 can be associated with 1) a ticket dispensed from a ticket, 2) coins dispensed from a coin dispenser, 3) a value written to a portable instrument, such as a credit card or a hand-held device like a cell phone, or 4) a value transferred off the gaming machine 1 to a remote account via an electronic fund transfer from the gaming machine 1 associated with an electronic wallet carried by a player. The fund transfer can be associated with an electronic wallet carried by the player.

In one embodiment, value transactions, such as fund transfers associated with an electronic wallet can benefit from additional verification. For example, a bill validator on the gaming machine 1 can be configured to initiate an electronic funds transfer associated with a player's mobile wallet. The mobile wallet can be an electronic wallet associated with the player's mobile phone or tablet computer. In one embodiment, the game controller 16 can be configured with software that doesn't recognize the mobile wallet functions provided by the bill validator. Instead, the candle 2 can be configured to handle the processing. The processing of transaction involving a mobile wallet can involve communications with remote servers and verification of the transaction. These mobile wallet processing and verification functions can be generated via 208.

FIG. 2 is a block diagram of a gaming machine 1 including dual port devices communicatively coupled to a candle device 2 in accordance with the described embodiments. The embodiment in the block diagram of FIG. 2 shows the optional elements of a dual-port bill acceptor 106, a dual-port printer 105, a touch screen display 4 with dual port control 103, a dual port audio system 104, and a monitoring connection 75 of the player tracking panel 3.

Dual port capability can be used to provide a non-intrusive method of maintaining system integrity and provide additional gaming features. Although not shown in the embodiment illustrated in FIG. 2, it will be understood that a gaming machine can include dual port devices communicatively coupled to a secondary processor located in the cabinet of the gaming machine. In addition, one or more of the devices can be a single port device where a secondary processor and a game controller share access to the single port.

In a dual port device, a first port can be used to provide the existing communication peripheral interface from the gaming machine to the dual port device. The game controller 16 and the peripheral device can communicate via the first port in a manner fixed by the use of regulated gaming software executed by the game controller and regulated software and/or firmware used by the peripheral device. The second port can be used to provide an enhanced interface with the controller 31. The second port on the dual port devices may be connected to the candle controller 31 via an appropriate interface. In particular embodiments, the controller 31 can be configured to receive commands and/or data from remote devices that are sent to the dual port devices via the second port. Further, the controller 31 can be configured to receive data from the dual port devices that are sent to one or more different remote devices via one of the communication interfaces, such as a wireless communication interface, on the candle 2.

The dual port touch screen display 4 can be configured to receive video content from each of the game controller 16 and the candle 2. In one embodiment, the dual port control 103 on the display 4 can be configured to receive sizing, scaling and positioning commands that allow content received from multiple sources to be displayed in different portions of the display. The sizing, positioning and scaling commands can result in content sent to the display 4 to be output in a stretched or a compressed format relative to the native resolution in which content the content is generated The dual port control 103 can be configured to generate translation functions for the video input and for the touch screen output that interpolates the video input to fit within a designated display area and interpolates the touch screen output to account for positioning and scaling commands received from an external device. In alternate embodiments, the candle controller 31 can be configured to perform the translation functions.

The touch screen display 4 can be the main display the gaming machine 1 where video content associated with a wager-based game generated by the game controller 16 is displayed. The game controller 16 can be configured to output the video content in a native resolution, such as 640 by 480. The video content can include indications of locations where a touch detected by a touch screen can cause the game controller 16 to perform an action in response. For instance, in response to a detected touch, the game controller can change the video content output to the touch screen display 4.

In alternate embodiment, the touchscreen display can be a secondary display. For example, on a stepper machine, the main display can be a set of mechanical reels and the touchscreen display can be reside in front of or adjacent to the mechanical reels. The secondary display can receive video content from a game controller, such as video content including credit, wagering or bonus information. In some instances, the video content from the game controller can be output to only portion of the secondary display and in other instances all of the secondary display can be used to output the video content from the game controller.

In one embodiment, the touch screen display 4 can be a replacement display such that it replaces the display installed in the gaming machine during manufacture. When used as replacement display, the touch screen display 4 can have a resolution that is greater than the native resolution in which the video content output by the game controller 16 is generated. For instance, the touch screen display 4 can have resolution of 1280 by 960 while the native resolution of the content output by the game controller 16 is 640 by 480. When a display technology with a fixed pixel size, such as an LCD, is used as the replacement display, interpolation and/or smoothing can be utilized to scale the content output from the gaming controller 16 to fit the resolution size of the display.

As described above, the dual port controller 103 can be configured to receive sizing, positioning and scaling related commands. In one embodiment, only the candle controller 31 is configured to generate these sizing, positioning and scaling related commands and not the game controller 16. For instance, the candle controller 16 can be configured to select picture in a picture modes that allows the video content output from game controller 16 to be displayed on different portions of the touch screen display 4 at different resolutions where the native resolution output by the game controller 16 and sent to the touch screen display 4 is constant.

The sizing, scaling and positioning commands can be associated with picture-in-picture (PIP) capability of the display 4. Using the PIP capability, video content can be transmitted from the candle and displayed as a PIP mode on the display 4. In one embodiment, the video can be transmitted via a USB interface. In other embodiments, other video transmission technologies can be used, such as an HDMI protocol and compatible cable. Via the candle 2, the PIP capability can be used to output real-time or stored video content.

In one embodiment, the candle 2 can control the PIP independently from the game controller 16. Thus, the game controller 16 is not aware that the video content that it is outputting is affected by PIP commands issued by the candle 2 or that the candle 2 is sending control commands to the display 4. In another embodiment, the game controller 16 can transfer or allow control of the display by the candle 2. As an example, the game controller 16 can be configured to hand over control to the candle 2 to allow it to display a bonus game presentation on all or a portion of the touch screen display 4. Thus, game controller 16 can engage in bi-directional communications with the candle 2 to indicate when the display is available and the candle 2 can communicate when it is finished using the display. When the candle 2 indicates it has completed displaying the bonus game presentation, the game controller can reassume control of the display. When the game controller 16 controls the display, it may prevent the candle controller 31 from outputting content to the display 4. Further details of the control of the dual port touch screen display 4 coupled to a game controller 16 and a candle controller 31 are described below with respect to FIGS. 3, 3B and 4. Although not shown in the embodiments illustrated in FIGS. 3, 3B, and 4, it will be understood that the dual port touch screen display 4 can be coupled to a secondary processor in the cabinet of the gaming machine instead of to the candle controller 31.

Communication links, which can be wired or wireless, are shown between communication interfaces TITO (Ticket-In/Ticket-Out) 97, link progressive 98, WAP 99, and player tracking 100 and associated communication interfaces on the controller 31. In this example, the communication interfaces are associated with the controller 31. In general, a gaming machine deployed in the field can be configured to interface with one or more external systems where the number of systems varies from gaming machine to gaming machine. For instance, a first gaming machine can be configured to interface with a wide area progressive system, a player tracking system and a cashless system while a second gaming machine can be configured to communicate with only a cashless system. The candle 2 can include multiple ports to provide communication support for gaming machines configured to communicate with different numbers of external systems.

The controller 31 can be configured to provide the multiplexing of the data streams received from the gaming machine 1. The resultant data stream can then be encrypted and sent to one or more remote devices 90. Further, the candle 2 can be configured to receive communications from one or more remote devices where a portion of the communications is in an encrypted format and decrypt the encrypted portions of the communications. The decrypted data can be sent to the respective communication interfaces of the gaming machine 1, such as 97, 98, 99 and 100.

Power switching 50 can receive power via interface 110 and output power via interface 111. One or more of the game controller 16, the audio device 104, the display 4, the dual port printer 105, the dual port bill acceptor 106 and the player tracking unit 3 can be connected to the power switching 50. The power switching 50 can be controlled in response to commands received from the candle controller to interrupt power to the one or more devices connected to the power switching 50 as part of a power cycling event. In one embodiment, the candle controller 31 can configured to cycle all of the devices on a gaming machine including or except for itself. A power cycling event may be initiated to clear an error condition on one of the devices. In one embodiment, the candle controller 31 can be configured to initiate the power cycling in response to a command received from one of the remote devices 90.

The dual-port bill acceptor 106 can be configured to read tickets (TITO) and paper currency and communicate this information on the first port, which is controlled by the regulated game program. JCM Global (Las Vegas, Nev.) is one example of a manufacturer that provides dual-port bill acceptors. The dual-port bill acceptor 106 can also be configured to read special promotional tickets and communicate this information on the second port to the candle 2. In addition, the dual-port bill acceptor 106 can provide cash and operational information to the casino operator on the second port to the candle 2. The controller 31 can be configured to send this information received from the bill acceptor to a remote device.

In one embodiment, the dual-port bill acceptor can be configured to perform electronic transactions involving a mobile device, such as 240. The electronic transactions can involve a mobile wallet application where the information received from the mobile device is used to initiate a transfer of funds to the gaming machine 1 from one of the remote devices 90. The candle controller 31 can be configured to provide communication services that allow the mobile wallet transaction to be processed. Further, the candle controller 31 can be configured to generate an interface on display 4 that allows data associated with the transaction to be input, output and verified.

The dual-port printer 105 can be configured to print tickets (TITO) provided by data on a first port, which is controlled by the regulated game program, or special promotional tickets provided by data on a second port. The promotional tickets can be customized and regularly updated. In one embodiment, the tickets can be personalized based upon an identification of a player at the gaming machine. In addition, the dual-port printer can be configured to provide operational information to the casino operator on a second port. FutureLogic (Glendale, Calif.) is one example of a manufacturer of dual port printers.

The audio channel on the dual port audio system 104 can be used to provide the ability to use the existing game machine audio speakers to provide voice and audio for the player that is not part of the game program. Further, the second port can be used to provide audio that is part of a bonus game presentation that is generated by the candle 2. In one embodiment, first audio content from the game controller can be mixed with second audio content from another source such that both the first and the second audio content are both output simultaneously. In another embodiment, the second audio content can replace the first audio content such that only the second audio content is heard.

The player tracking monitoring port can be used to provide non-intrusive monitoring of the player tracking data to provide player ID information for the casino operator. In one embodiment, this data can be utilized by the candle 2 to provide custom content to a player. For instance, the player ID data can be used to target a personalized promotional opportunity selected based upon known information about the player. The personalized promotional opportunity can include a custom ticket that is printed by the printer. The customized ticket can include custom graphics and player identification information, such as the player's name.

In particular embodiments, when a dual port device, such as the bill acceptor 106 includes regulated software, such as regulated firmware, the regulated software can be decoupled from other software on the peripheral device. The regulated portion of the software may govern interactions between the peripheral device and the game controller 16. Changing the regulated portion of the peripheral software typically requires a lengthy approval process.

The non-regulated portion may involve interactions that do not involve the game controller 16 and thus, a gaming control board may allow this portion of the software to be updated without regulatory approval or under a much less stringent approval process. In various embodiments, the unregulated or less regulated portion of the peripheral software can be updated via the controller 31. For instance, if a new fraud detection algorithm is needed, such as to detect a new type of counterfeit currency, then the new detection algorithm can be downloaded to the bill acceptor via the second port of the dual port bill acceptor. If necessary, the power on the dual port bill acceptor can be cycled to allow the bill acceptor to restart using the new software or firmware.

Figure 3A:
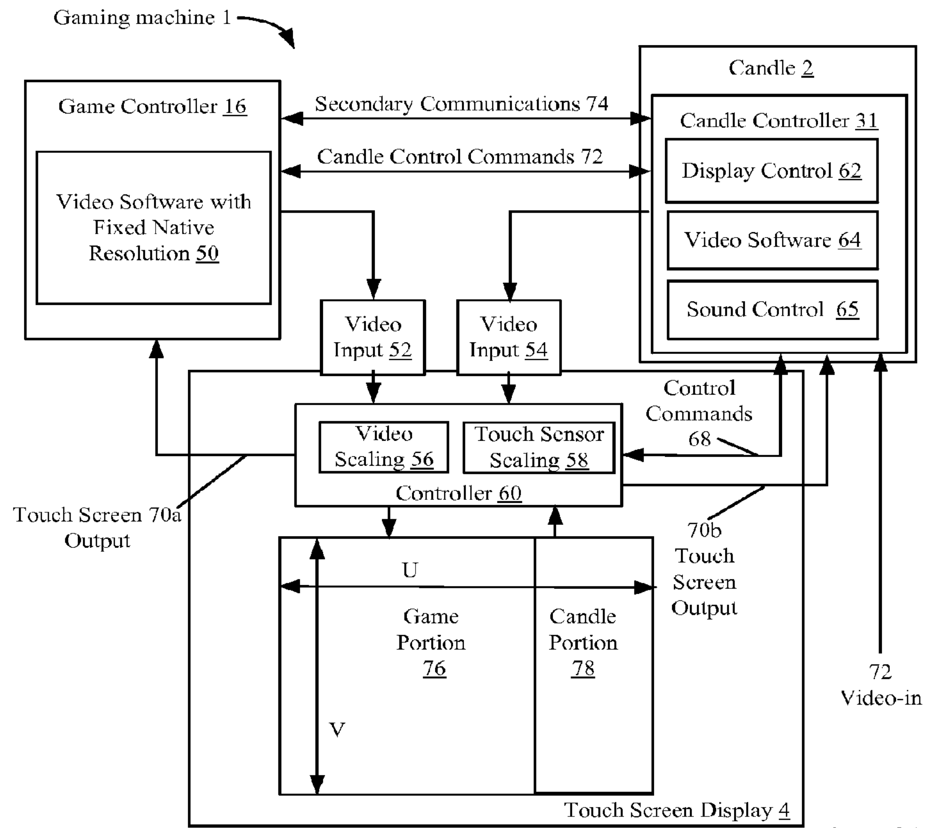
FIG. 3A is block diagram of a gaming machine including a dual port touch screen display communicatively coupled to a candle device in accordance with the described embodiments.
Figure 3B:
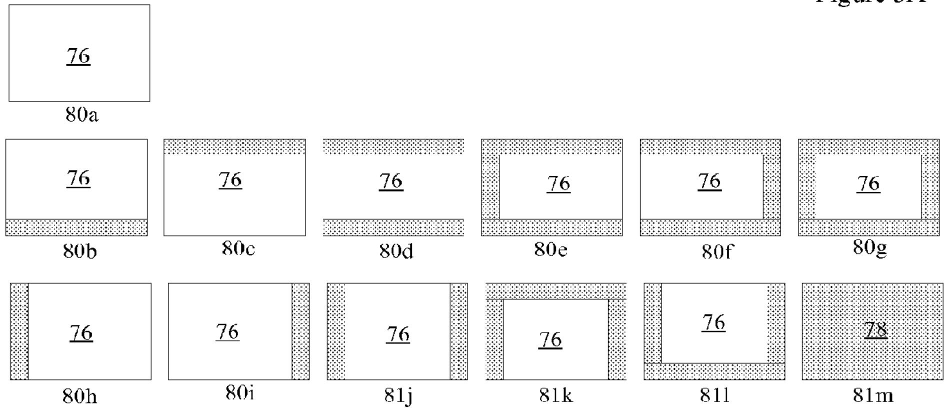
FIG. 3B is block diagram of picture in a picture (PIP) modes for a dual port touch screen display in accordance with the described embodiments.
Figure 4:
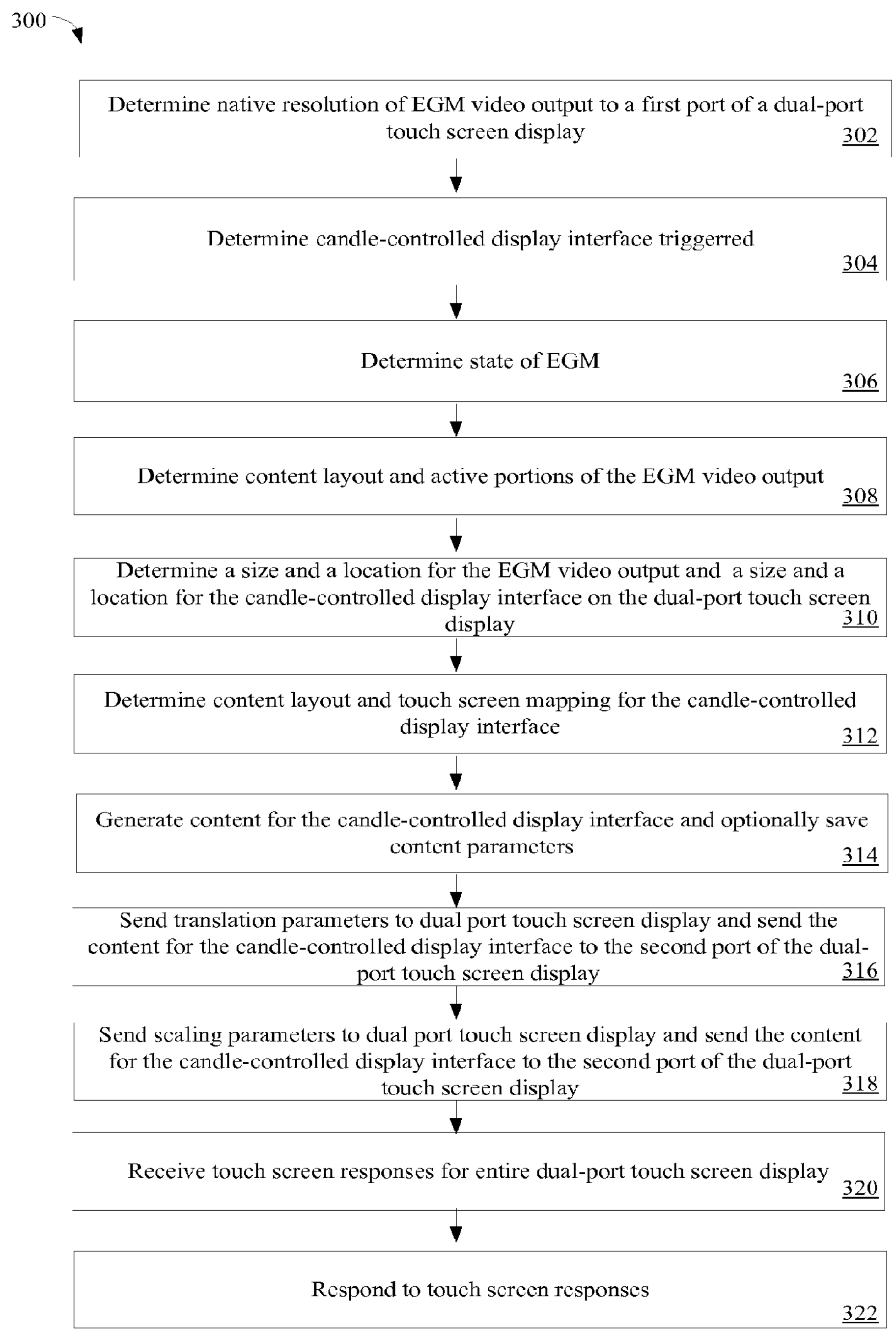
FIG. 4 is a flow chart of a method for controlling dual port touch screen display in accordance with the described embodiments.

Next, methods and apparatus for generating the display interfaces on a gaming machine are described with respect to FIGS. 3A, 3B and 4. In a particular embodiment, a dual port touch screen display device described above with respect to FIG. 2 can be coupled to a game controller and a candle controller allowing the display to receive and to display simultaneously content from both the game controller and the candle controller. To provide a display interface, the candle controller can be configured to respond to touch screen data associated with selectable buttons (active areas) in the content output by the candle controller to the display as is described in more details as follows.

FIG. 3A is block diagram of a gaming machine 1 including a dual port touch screen display 4 communicatively coupled to a candle device 2. As described above, the game controller 16 can be configured via a first communication interface to send candle control commands 72 to the candle 2. In response to receiving the commands, the candle controller 31 can turn on or turn off various lighting elements on the candle. As described above, a combination of lighting elements that are lit on the candle can be used to convey information about the gaming machine 1, such as an attendant is needed at the gaming machine. In addition, via a second communication interface, the candle controller 31 can be configured to monitor messages sent to or from the game controller 16 devices. In one embodiment, the candle controller 31 can be configured to communicate directly with the game controller 16 to request information 74, such as accounting, player tracking information or information related to its current state.

The dual port touch screen display 4 can include a number of display modes that allow video content from the game controller 16 and the candle controller and/or another gaming device to be simultaneously output from the display 4. Some examples of display modes are illustrated in FIG. 3B. In a particular embodiment, the touch screen display 4 can include at least two video inputs, 52 and 54, for receiving video data. In one embodiment, the game controller 16 can be configured to send video content to the touch screen display 4 via the video input interface 52 and the candle controller 31 can be configured to send video output to the touch screen display 4 via the video input interface 54.

The touch screen display 4 can be EST model manufactured by Digitech Systems co. LTD (Korea). Examples of screen sizes include 15, 17, 19 and 23 inch models. The controller 60 can also be provided by Digitech Systems (e.g., a DTC-01N or the DTC-02S-02). The controller 60 can support a proprietary serial communication protocol, such as Netplex or an open protocol, such as USB.

In particular embodiments, the first video input interface 52 can be a VGA or DVI compatible interface. As examples, resolution from about 640×480 up to 1920×1080 can supported. The 1920×1080 can support an HD signal. The aspect ratios of the input from the game controller can be one of 4:3, 16:9, 16:10 and 5:4. The second input interface 54 can also be a VGA or DVI compatible interface. For instance, the candle controller 31 can provide a DVI signal at 1280×1024 resolution.

The touch screen display 4 has a native resolution, such as U by V pixels. For instance, the resolution of the touch screen display 4 can be about 1280 by 960 pixels where U=1280 and V=960. The touch screen display 4 can include a controller 60 that is configured to receive commands that allocate a portion of the display 4 to video content provided from the game controller 16 and video content provided by the candle controller 31. In FIG. 3A, the portion of the display 4 allocated to content from the game controller 16 is referred to the game portion 76 and the portion of the display 4 allocated to content from the candle controller 31 is referred to as the candle portion 78.

The content output to the display by the game controller 16, the candle controller 31 and/or another gaming device can include active areas where a touch input detected by the touch screen can result in response by the game controller 16 or the candle controller 31. The game controller 16 can be configured to receive touchscreen output 70*a* from a controller 60 associated with the display 4. Based upon the touchscreen output 70*a* received from controller 60, the game controller 16 can determine whether any active areas of the touch screen have been selected. The candle controller 31 can also be configured to receive touch screen output 70*b* from the controller 60. Based upon the touch screen output 70*b*, the candle controller 16 can determine whether any active areas of the touch screen have been selected.

In one embodiment, the video input, touch screen output and control commands 68 can be communicated via separate interfaces. For instance, video content from the controller 31 can be sent to the display 4 via a first interface, such as 54, control commands 68 can be sent to the display 4 via a second interface and touch screen output can sent to the controller 31 via a third interface. In other embodiment, a common interface can be used to communicate video content, control commands and touch screen output between a particular device, such as the game controller 16 and the candle controller 31, and the display 4. For instance, a first USB interface can be used to communicate video content, control commands 68 and touch screen output 70*b* between the controller 31 and the display 4.

In particular embodiments, the display 4 can utilize a display technology, such as a LCD technology, where a pixel size associated with the display is fixed. The native resolution of a LCD, LCoS or other flat panel display refers to its single fixed resolution. As an LCD display consists of a fixed raster, it cannot change resolution to match the signal being displayed as a CRT monitor can. Thus, optimal display quality can be reached only when the signal input matches the native resolution of the display 4. An image where the number of pixels is the same as in the image source and where the pixels are perfectly aligned to the pixels in the source is said to be pixel perfect. For instance, a 640×480 image mapped to a 640×480 portion of an LCD can be considered pixel perfect.

When the signal input doesn't match the native resolution of the display interpolation is used. Interpolation (scaling of the image) causes a loss of image quality. When the resolution of the video content received by the display 4 is smaller than the native resolution of the display it can be scaled up. When the resolution of the video content received by the display is larger than the native resolution of the display it can be scaled down. In one embodiment, the interpolation can be performed by the video scaling 56 in the controller 60. In another embodiment, the candle controller 31 can be configured to receive video content from the game controller 16, scale it to fit a resolution on the display to which it is to be output and then send the scaled video content to the display 4.

The display 4 can include a controller 60 configured to receive control commands that affect a size and a position of the game portion 76 and the candle portion 78. In a particular embodiment, only the candle controller 31 and not the game controller 16 is configured to generate and send control commands 68 to the controller 60 that affect the size and the position of the game portion 76 and the candle portion 78. In one embodiment, the display 4 can be configured to only receive control commands from one device. In the candle controller 31, the display control 62 can be configured to determine the size and the position of the game portion 76 and the size and the position of the candle portion 78. Unless a size selected for the game portion 76 is pixel perfect, the size of the game portion 76 selected by the candle controller 31 can affect how the video content from the game controller 16 is interpolated onto the display 4 and hence, a quality of the subsequent image that is displayed.

The image quality that is displayed after interpolation on the display 4 can be affected by the resolution of the video content generated by the game controller 16 and the size of the game portion 76 selected by the candle controller 31 where some sizes selected for the game portion 76 can produce better interpolation results and hence, a higher output image quality than other sizes. In particular embodiments, the candle controller 31 can be configured to determine the resolution of the video content output from the game controller 16 and select a size for the game portion 76 to produce better interpolation results.

In various embodiments, the candle controller 31 can determine the resolution of the video content output from the game controller 16 in a number of different manners. For instance, it can retrieve the information from a memory location on the candle controller 31 where it was previously stored, it can request the information directly from the game controller 16 or it can request the information from a remote server. The candle controller 31 may receive information from the game controller 16 and/or a remote server, such as information that identifies the model of the gaming machine 1, which allows the candle to determine the resolution of the video content generated by the game controller 16. Based upon the determined resolution of the content output by the game controller 16, the candle controller 31 can determine parameters for scaling up and/or down the content on the display 4.

The touch screen display 4 can be configured to generate different a number of different display modes that affect a size of the game portion 76 and the candle portion 78. As described above, in one embodiment, only the candle controller 31 can be configured to provide commands that select a display mode to utilize on the display 4. As examples, the display 4 can be configured to provide all or a portion of the display modes 80*a*-80*m* illustrated in FIG. 3B where the candle controller 31 determines which of these display modes to use at a particular time. These display modes are described as follows.

In display mode 80*a*, all of the display 4 is allocated to the game portion 76 whereas in display mode 80*m*, all of the display 4 can be allocated to the candle portion 78. In display mode 80*b*, a top portion of the display 4 is allocated to the game portion 76 and a bottom horizontal strip is dedicated to the candle portion 78. In 80*c*, a top horizontal strip is allocated to the candle portion 78 and a bottom portion is allocated to the game portion 78. In 80*d*, a top and a bottom horizontal strip are allocated to the candle portion 78 and a center portion is allocated to the game portion 76. In 80*h* a left vertical strip is allocated to the candle portion 78 and the remaining portion is the game portion 76. In 80*i*, a right vertical strip is allocated to candle portion 78 and the remaining portion is the game portion 86. In 80*j*, left and right vertical strips are allocated to the candle portion 78 and the center portion is allocated to the game portion 76.

The candle controller can be configured to select a thickness for the left and/or right vertical strips or the top and/or bottom horizontal strips. In one embodiment, when two or more strips are selected, such as a top and a bottom horizontal strip, the candle controller 31 can select the strips to be of the same thickness (horizontal strip) or width (vertical strip). In another embodiment, the candle controller 31 can select the thickness/width of the strips to be different sizes.

In 80*e*, a top and a bottom horizontal strip and a left vertical strip are allocated to the candle portion 78 and remaining portion is allocated to the game portion. In 80*f*, a top and a bottom strip and a right vertical strip are allocated to the candle portion 78 and the remaining portion is allocated to the game portion. In 80*k*, a left and a right vertical strip and a top horizontal strip are allocated to the candle portion 78 and a remaining portion is allocated to the game portion 76. In 80*l*, a left and right vertical strip and a bottom horizontal strip are allocated to the candle portion 78 and a remaining portion is allocated to the game portion 76. In 80*g*, a top and bottom horizontal strip and a left and right vertical strip are allocated to the candle portion 78 and a center portion is allocated to the gaming portion.

In 80*m*, the candle portion 78 is rectangular and allocated the entire display such that none of the video content from the game controller 16 is visible on display 4. In alternate embodiments, a smaller rectangle can be used for the candle portion 78 such that the game portion 76 is only partially obscured by the candle portion. A disadvantage of this approach is that the candle portion 78 needs to be positioned and placed such that it doesn't obscure any important information associated with the game portion 76 such as the outcome of a wager-based game displayed in the game portion 76. Thus, using this type of picture in a picture mode, the candle controller 31 may need to determine at any given time the content that is displayed in the game portion 76 to avoid obscuring it with an overlapping candle portion 78.

In one embodiment, the candle controller 31 can be configured to utilize only display modes that never overlap and obscure the game portion 76. For instance, the candle controller 31 can be configured to utilize display modes 80*a*-80*l* in FIG. 3B where the game portion 76 is rectangles of different sizes. The video content associated with the game portion 76 can be scaled to fit the different size rectangles but is never partially covered by the candle portion 78. Further, the candle controller 31 can select the scaling parameters such that the content displayed in the game portion 76 is an acceptable quality after scaling to allow information associated with the content, such as a game outcome, to be adequately displayed to a player. An advantage of this approach is that the candle controller 31 doesn't have to determine the current content of the game portion 76 when selecting a display mode that allows video content associated with the candle portion to be displayed, such as display modes 80*b*-80*l*.

As described above, the touch screen display 4 can be a retrofit display that replaces the original display that was installed during manufacture of the gaming machine where the touch screen display 4 can have a different resolution than the resolution of the video content generated by the game controller 16. For example, the resolution of the video content can be 640×480 while the resolution of the replacement display can be 1280×960. In a particular embodiment, the resolution of the replacement display can be larger than the resolution of the video content and the candle controller 31 can be configured to select a display mode where the resolution of the game portion 76 for the display is always greater than or equal to the resolution of the video content generated by the game controller 16. Thus, the content is displayed pixel perfect or in a scaled up format. For instance, if the resolution of the video content generated by the game controller is 640×480 then the minimum U dimension selected by the candle controller 31 is greater than or equal to 640 and the minimum V dimension selected by the candle controller 31 is greater than or equal to 480. In one embodiment, the candle controller can be configured to only select a picture perfect (no scaling) for the content from the game controller 16.

When the U an V dimensions are selected as described in the previous paragraph, the video content generated by the game controller 31 can be stretched (interpolated) in the U, V or both U and V directions when it is displayed in the game portion 76. However, the video content generated by the game controller 31 is never shrunk below the resolution output by the game controller 31 in the U and V directions. It may not be desirable to scale down the video content generated by the game controller 31 below the resolution in which it is output from the game controller 16 because shrinking causes data to be removed from the image and hence information to be lost.

Returning to FIG. 3A, the game controller 16 can include software 50 for generating the video content sent to the display 4. In one embodiment, the output resolution of the software 50 can be fixed such that video content with the same resolution is sent independent of the size of the game portion 76 selected by the candle controller 31. The video content which is sent from the candle controller 31 to the display 4 can be generated by the video software 64. In particular embodiments, the candle controller 31 can be configured to generate video content with different resolutions depending on a size and a format of the candle portion 78 selected by the candle controller. For instance, the candle controller 31 can be configured to select a size of the candle portion 78 and then generate content that is pixel perfect with the size of the candle portion.

In one embodiment, the candle controller 31 can be configured with a maximum resolution for the content output. For instance, the maximum dimension of a strip can be 120×1024. The candle controller 31 can select a strip with smaller dimensions, 60×1024. However, the candle controller will not select a strip with larger dimensions, such as 150×1024. When the smaller dimensions are selected, the content sent to the display 4 will be the maximum resolution, such as 120×1024. After receiving the content, controller 60 can be configured to scale down the content to a smaller resolution, such as 60×1024.

In one embodiment, the candle 2 can receive video signals 72 including audio from a remote device. For instance, the video signals can be associated with a live sports event or live broadcast television. In addition, the video signals can be associated with pre-recorded content, such as previously aired television shows, theater movies, music videos or Internet content (e.g., YouTube videos). The video software 64 can be configured to integrate video signals from one or more video feeds into the video content output in the candle portion 78.

Sounds can be associated with the video content output from the candle controller 31. For instance, a video feed for a live sporting event displayed in the candle portion 31 can include commentary associated with the sporting event. The sound control 65 associated with the candle controller 31 can be configured to output the sounds associated with the video content. In one embodiment, the sounds can be output via an audio device, such as a speaker associated with the candle 2. In another embodiment, the sounds can be output via an audio device associated with a gaming machine, such as a dual port audio device. In yet another embodiment, the candle 2 can be configured to output the sounds via a device carried by a player such as a Bluetooth™ headset or via headphones coupled by wire to an audio output jack on their cell phone. In one embodiment, the controller 31 can generate an interface in the candle portion 78 that allows a player to choose a method for outputting sounds associated with the video content form the controller 31, change the volume of the sound and/or mute the sound.

As described above, the video content associated with the game controller 16 and the candle controller 31 can include a number of active areas where in response to touch screen input received in the active areas, the game controller 16 or the candle controller 31 can generate a response. The touch input associated with an active area is received when the touch screen is activated above a location where the active area is output on the display 4. To respond properly to a touch, the active areas displayed in the video content need to be mapped to corresponding locations on the touch screen, i.e., the receiving devices determines that a touch input received at a particular location and detected by the touch sensor corresponds to an active area displayed at the location on the display 4.

Typically, the game controller 16 will expect to receive touch screen output that corresponds to a game portion 76 filling the entire display screen (e.g., display mode 80*a*). The game controller 16 may not be aware of changes in size and position of the game portion on display 4 that can affect the locations where the touch sensor detects input for a particular active area that is output to the display 4. Thus, when the video content associated with the game portion 76 is output in window size and with a location different from a full screen mode, the touch screen output 70*a* sent to the game controller 16 may no longer match the locations of active areas expected by the game controller 16. To account for changes in position and size of the game portion, a transformation operation can be performed that interpolates the input received by the touch screen on display 4 for a particular size and position of the game portion to an input expected by the game controller 16. These transformation operations are discussed in more detail in the following paragraphs.

Figure 7:
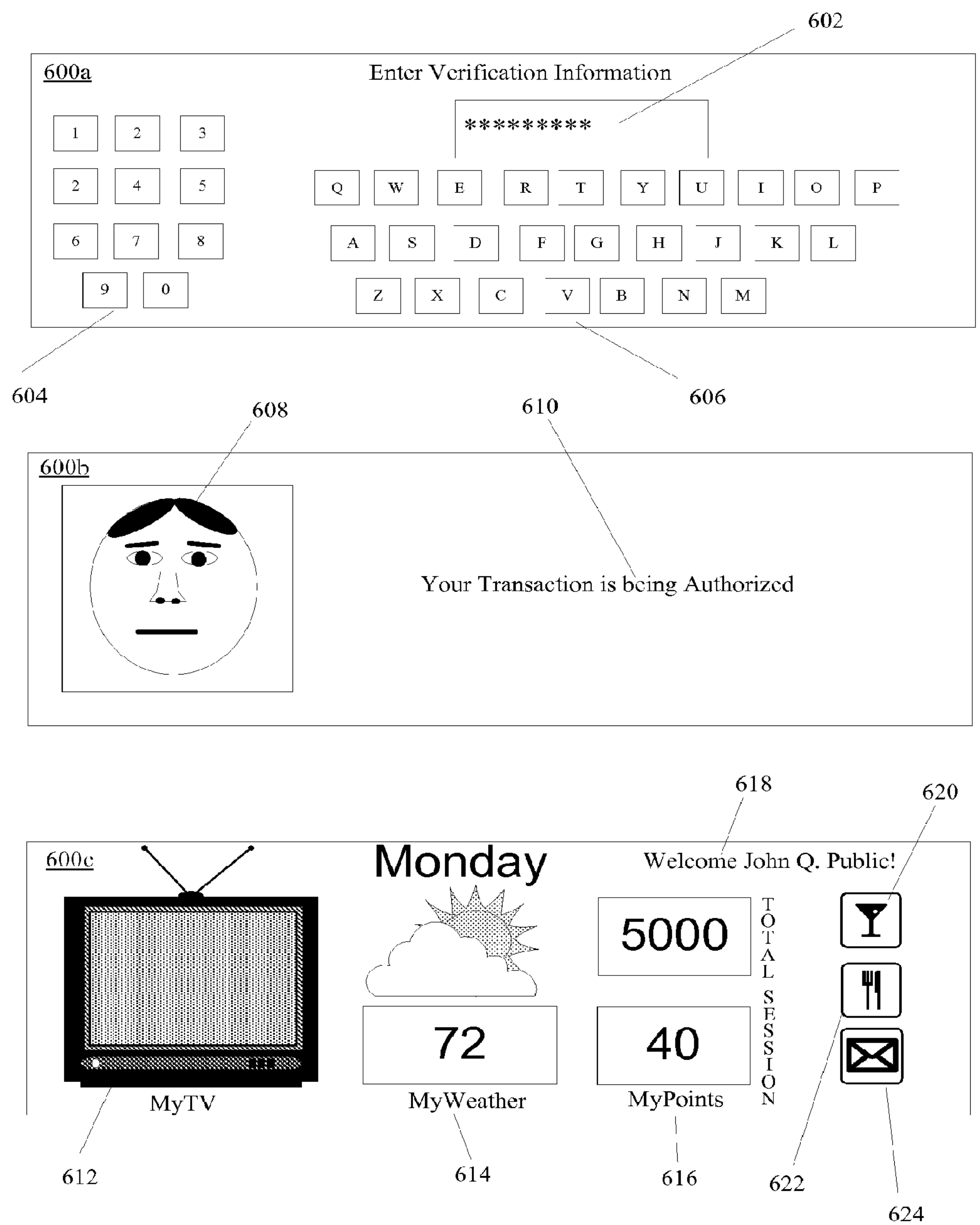
FIG. 7 includes diagrams of display interfaces generated using a candle device in accordance with the described embodiments.

The controller 60 can be configured to scale the touch screen output 70*a* sent to the game controller 16. For instance, the candle controller 31 can be configured to provide a resolution of the video input 52 from the game controller 16 and a resolution of the game portion 76 to the controller 60 where the resolution of the game portion 76 can be different from the resolution of the video content from the game controller 16. Using this input, the controller 60 can be configured to interpolate the touch screen results to match the resolution of the video content of the game controller 16. As an example, the resolution of the game portion 76 can be 960×720 and the resolution of the video content from the game controller 16 can be 640×480 and the controller 60 can be configured to scale touch inputs received in the 960×720 game portion 76 to the 640×480 size. After scaling, the touch screen output 70*a* can be sent to the game controller 16 in the 640×480 size. As shown in FIG. 7B, the game portion 76 can be positioned at different locations on the display 4. The controller 60 can be configured to account for the position of the display portion 76 when performing the scaling. For instance, the game controller 16 can expect the touch screen input to start in the lower left hand corner of the display 4 and the controller 60 can be configured to scale the touch screen output so that it appears to start from this location. In alternate embodiments, the candle 2 can be configured to perform this scaling and then send the scaled results to the game controller 31.

In one embodiment, the candle 2 can be configured to receive the touch screen output 70*b* for the entire display including the game portion 76 and the candle portion 78 while the game controller 16 only receives the touch screen output 70 from the game portion 76 scaled to the resolution of the video content from the game controller 16. The candle controller 31 can be configured to determine if any of the touch screen input corresponds to active areas associated with video content generated and output to the display in the candle portion 78. When candle controller 31 detects that a location on the touch screen sensor has been activated that corresponds to an active area in the video content generated by the candle controller 31, the candle controller can perform an action in response. For instance, in response to detecting touch sensor data that corresponds to an active area, the candle controller 31 can generate new video content in the candle portion 78 and/or rearrange the content in the candle portion 78.

In particular embodiments, the candle 2 can be configured to save and/or send touch input associated with the game portion 76 to a remote device. The touch input associated with the game portion 76 can be in the scaled or non-scaled format. The remote device can be configured to determine whether the touch screen input is associated with any active areas generated by the display when the touch screen data was received. To make this determination, the candle 2 can also be configured to send information related to a state of the wager-based game generated by the game controller 16 to the remote device, such as whether the gaming machine is in an idle state, displaying an outcome to a game, between games or in a bonus state. Further, the candle 2 can be configured to send to the remote device information regarding details of the game output by the game controller, such as a particular version of a video slot game by a particular manufacturer. The state information can be used by the remote device to determine what content is associated with the touch input and whether any active areas have been selected.

In response to determining an active area has been selected in the game portion, the remote device can send commands to the candle that cause the candle controller 31 to alter the content output to the candle portion 78. For instance, in response to detecting a see pays button being activated in the game portion 76, the remote device can be configured to send commands to the candle controller 31 to output additional video content in the candle portion 78 for a supplementary bonus game generated by the candle controller 31. In another embodiment, when remote device determines a selection of a particular symbol in a bonus game generated by the game controller 31 has been selected, the remote device can send commands to alter the content displayed in the candle portion 78. For instance, in response to detecting the selection, the remote device can command the candle controller 31 to output video content associated with a supplementary bonus game that can include an additional award being provided to the player that is separate from the award associated with the bonus game generated by the game controller 16.

In another example, the remote device can command the candle controller 31 to generate a bonus presentation that augments the bonus presentation provided by the game controller 16. The supplementary bonus game presentation generated by the candle controller 31 can include time relevant information. For instance, if the bonus game from the game controller is triggered during a super bowl weekend or Saint Patrick's Day, then the bonus game from the candle controller 31 can include a super bowl theme or a Saint Patrick's Day theme that complements the bonus game output by the game controller 31.

In alternate embodiments, the functions performed by the remote device can be performed by the candle controller 31. Thus, the candle controller 31 may not have to send the touch screen output associated with the game portion 76 to the remote device. For instance, the candle controller 31 can be configured to determine that a bonus game has been triggered, is displayed in the game portion 76 and that a particular symbol selection associated with the bonus game has been made. In response to the determination, the candle controller 31 can be configured to generate and output a supplementary bonus game presentation to the candle portion 78.

In one embodiment, the touch screen display can support a multi-touch capability. For instance, the controller can be configured to detect and report two touch inputs on the touch screen moving towards one another or moving away from one another. The candle controller 31 can be configured to respond to the multi-touch output. For instance, in response to the detection of two touch inputs moving together, the candle controller 31 can be configured to reduce the size of or close the candle portion 78 or close a menu in the candle portion. Whereas, in response to the detection of two touch inputs moving away from one another, the candle controller 31 can be configured to open the candle portion 78 or open/expand a menu in the candle portion.

Next with respect to FIG. 4, a method 300 for a candle device to control a dual port touch screen display is described. As described with respect to FIG. 3A, the dual port touch screen display can be coupled to both a game controller on a gaming machine and a candle controller in the candle device. The candle controller can be configured to control a display mode associated with the touch screen display that affects the size and location of where content generated by the game controller and content generated by the candle controller is output to the touch screen display.

In 302, the candle controller can be configured to determine the resolution of a gaming machine's video output to a first port of a dual port touch screen display. The candle controller can be coupled to a second port of the dual port touch screen display. In 304, the candle controller can determine a candle-controlled display interface is triggered. In 306, in response to detecting the display interface is triggered, the candle controller can be configured to determine a state of the EGM.

In one embodiment, the state of the EGM can affect whether the display interface is generated on the touch screen display. The candle controller can be configured to not generate a display interface during certain states of the EGM, such as when the outcome presentation to a wager-based game is being dynamically output to the touch screen display. For instance, if the video reels for a video slot game are currently being output as spinning on the display, the candle controller can be configured to wait until the presentation is complete (i.e., the reels stop spinning) before generating the triggered display interface.

In another embodiment, in 308, the state of the EGM can be used by the candle controller or a remote device to determine whether a touch screen input, in area where the game content from the game controller is being output, is associated with an active area of the game content. The active area of the game content can be related to such functions as displaying the "pays" associated with the game, initiating a game, making game decisions (e.g. holding particular cards) or making a choice associated with a bonus game (e.g., selecting or more bonus symbols from among a number of bonus symbols that are displayed).

In response to determining the touch screen input is associated with an active area, the candle controller can be configured to perform a supplementary action that can affect the content output to the display from the candle controller. For instance, when it is determined one or more particular cards have been held in a card game output by the game controller, the candle controller can be configured to output a supplementary bonus game to the touch screen display or provide the opportunity for a side bet based on the held cards. The game controller responds to the touch input as it normally does and is not affected by the supplementary response performed by the candle controller. For instance, if the game controller determines that a see pays button has been selected, the game controller can generate a see pays screen which is output to the display. As another example, if the game controller determines that particular cards have been held in a card game, the game controller will proceed with normal play of the game independently of whether or not the candle controller, in response to certain cards being held, generates and outputs content related to a side bet or a supplementary bonus game.

In 310, the candle controller can be configured to determine a size and location for displaying the EGM video output and a size and a location for a candle-controlled display interface on the dual port touch screen. As describe above, the determination can involve selecting a display mode including a game portion and a candle portion for the touch screen display. The size of the game portion can be selected to preserve a display quality of the game content. For instance, the size of the game portion can be selected to be pixel perfect or a non-pixel perfect size can be selected that produces good interpolation results.

In 312, the candle controller can determine the content and the layout of the content that is to be output to the touch screen display in the candle portion. The content can include a number of active areas that when selected via touch screen sensor associated with the display can cause the candle controller to perform an action, such as change the content associated with the candle portion. The candle controller can determine a touch screen mapping that associates the active areas output to the display with locations of touch screen data that will cause the candle controller to respond. The touch screen mapping may change depending on the content currently displayed in the candle portion and the display mode selected for the candle portion.

In 314, the candle controller can generate the content for candle-controlled display interface. The candle controller can be configured to generate content with different resolutions depending on a size selected for the candle portion. In one embodiment, a maximum resolution for the candle content can be selected where the candle controller is configured to select a display resolution that is equal to or less than the maximum resolution. The maximum resolution content can be utilized for all the display resolutions selected by the candle controller. In the case where the display resolution is smaller than the resolution of the candle content, the candle content can be scaled down to fit the display resolution.

The candle controller can be configured to save to a memory portions of the candle content and/or parameters used to generate the content that are output at any particular time. In addition, information relating to the context in which the content was generated can be stored. For instance, a time at which particular candle content was output, a display mode to which the candle content was output and a state of the game when the candle content was generated can be output. In one embodiment, the saved candle content and/or parameters used to generate the content can be used for auditing or dispute resolution purposes.

In 316, the candle controller can send control commands to the touch screen display. The control commands can affect a size and position of where content from the game controller and content from the candle controller is to displayed to the touch screen display. In addition, the display parameters can affect a scaling of touch screen data received from the touch screen sensor. The scaling can affect how touch screen data is returned to the game controller. In one embodiment, the resolution of the content output by the game controller and sent to the display can be constant for any of the combination of display parameters selected by the candle controller. Thus, at a first time the candle controller can select a game portion of a first size and at a second time the candle controller can select a game portion of a second size for displaying the game content where at each time the resolution of the game content generated by the game controller is the same. In 316, the candle controller can also send content for a candle portion to the touch screen display.

In 318, the candle controller can receive touch screen responses associated with both game portion and the candle portion where game content and candle content are each respectively displayed in the game portion and the candle portion. In one embodiment, the candle controller can be configured to determine whether only touch screen input associated with active areas of the candle content have been received. When the candle controller determines that an active area associated with the candle content has been selected in 320 the candle controller can respond. One response is to change the content output in the candle portion. In another embodiment, the candle controller can determine that an active area associated with the game content has been selected and in response change the content output in the candle portion. The candle controller can be configured to save touch screen data associated with only candle portion or both the candle portion and the game portion, such as a location on the touch screen where a touch screen input has been detected and a time that the touch screen input was detected.

In a particular embodiment, verification of electronic transactions involving a transfer of funds to the gaming from a remote account is provided. The funds transfer can be initiated from a portable electronic device, such as a smart phone or a table computer. A candle device can be configured to generate a verification interface using a display of the gaming machine. Alternatively, a secondary processor within the cabinet of the gaming machine can be configured to generate the verification interface. The verification interface can allow a player to enter verification information that can be used to validate the transaction. Further, the verification interface can be used to indicate a status of the transaction, such as whether it is being authorized, has been approved or has been rejected.

Figure 5:
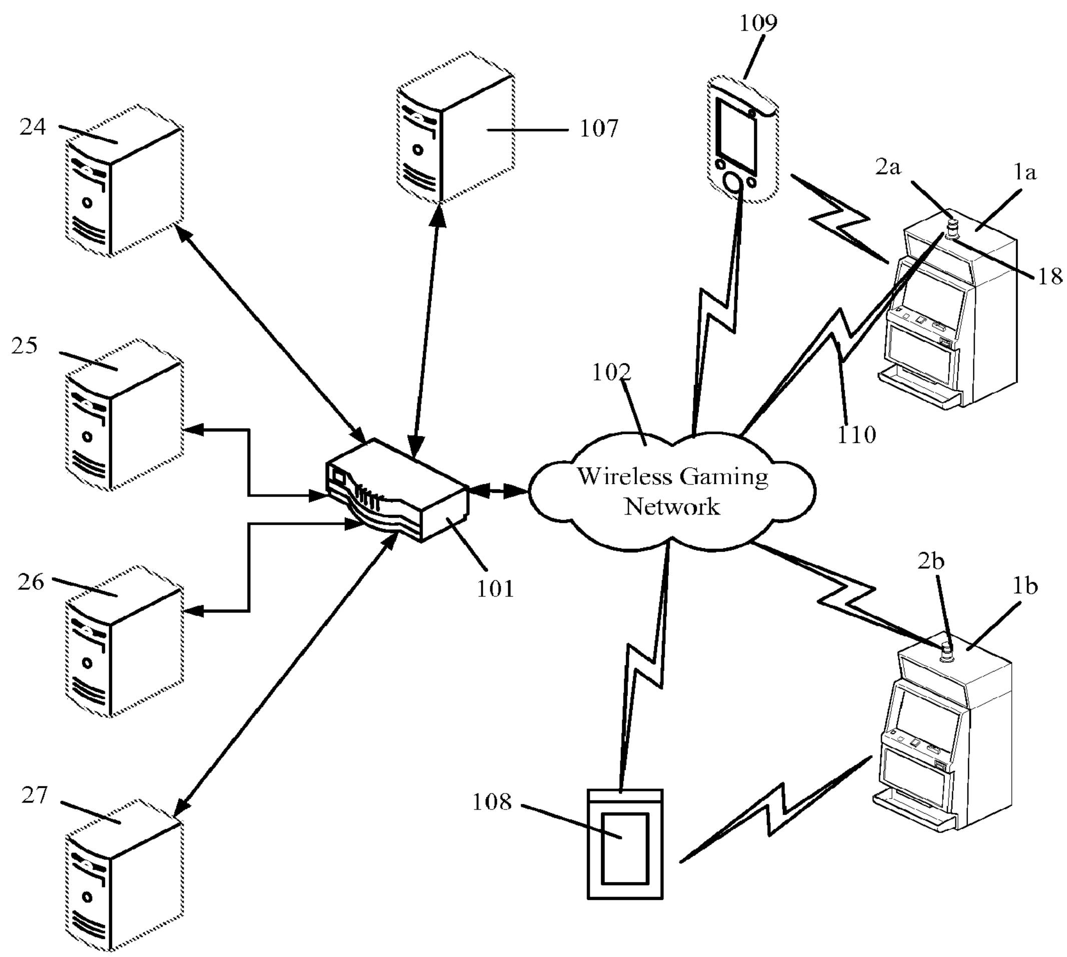
FIG. 5 is a diagram of a gaming system including gaming machines outfitted with candle devices and configured to communicate with mobile devices in accordance with the described embodiments.

FIG. 5 is a diagram that illustrates a gaming system including gaming machines that wirelessly communicate with servers in accordance with the described embodiments. In one embodiment, the gaming system can include one or more gaming machines, such as 1*a* and 1*b*. The gaming machines can be different models and types supplied by different gaming machine manufacturers. The gaming machines can each be equipped with candle device, such as 2*a* and 2*b*. In one embodiment, the candle devices can be coupled to a dual port touch screen display on the gaming machines 1*a* and 1*b*. The candle devices, 2*a* and 2*b*, can be configured to generate on the touch screen display devices an interface for verifying a transaction.

In one embodiment, a wireless radio can be located within a candle, such as 2*a* or 2*b*. In another embodiment, a wireless radio, such as 18, can be located separate from the candle. In FIG. 5, the wireless radio is mounted between the candle 2*a* and the exterior of the EGM cabinet on an exterior portion of the EGM. In other embodiments, the wireless radio can be mounted within an interior or exterior portion of the EGM. In one embodiment, an antenna for the wireless radio can be configured to point toward the ceiling to interface with wireless access points pointing downwards.

This configuration of wireless radio and access point can help to minimize interference.

The candle devices 2_a_ and 2_b_ can be configured for wireless communications. Alternatively the cabinet of the gaming machine 1 can be configured with one or more antennas for wireless communications. Using the wireless capabilities, a gaming network 102 can be provided. Via the gaming network 102, the wirelessly enabled gaming machine 1 can communicate with a system controller 101, such as via wireless communications 110. The system controller 101 can transmit and receive data from the gaming network 102. In one embodiment, the system controller 101 can be configured to de-multiplex/de-encrypt the data stream from the gaming machines equipped with wireless capabilities and send the resultant data streams to the respective gaming system servers to which particular wireless communications are addressed.

In particular embodiments, wireless access points can be provided that allow a portable electronic device, such as 109, to communicate with other gaming devices in the wireless gaming network. For instance, via a Bluetooth™ interface in the candles 2_a_ or 2_b_, a portable electronic device can be allowed to communicate with a casino server, such as 120. As another example, Wi-Fi access points can be distributed throughout a gaming environment, such as a casino, which allow communications with a casino server. In one embodiment, the casino server can support a hospitality application executing on the portable electronic device. For instance, MGM resorts International™ provides an "M life" players club application that can be executed on a player's portable electronic device, such as 109.

In another example, the gaming machines, such as 1_a_ and 1_b_, can include other devices capable of communicating with a portable electronic device. For example, a gaming machine can include a secondary device, such as a bill validator, which is configured to receive account information that enables electronic cash transaction from a portable electronic device. In one embodiment, the portable electronic device can include an NFC (Near field Communication) interface that can communicate account information via a NFC interface on the gaming machine, such as an NFC interface on a bill validator. As an example, the portable electronic device can execute an electronic wallet application that supports electronic purchases via an NFC interaction like PayPass™ by MasterCard™. The electronic wallet application can be used to initiate a transfer of funds that allows credits to be deposited onto the gaming machines.

After a device, such as the bill validator receives information via the NFC interaction, the bill validator can be configured to send the information to the candle device. The information can include an account identifier from which the funds are to be transferred. In response, the candle device can be configured to generate a verification interface that allows transaction validation information associated with the account to be entered. Further, the candle device can be configured capture an image of the person that is requesting the transaction.

Typically, it is not possible to provide an interface for entering verification data via the bill validator because the bill validator is only afforded a small area on the outer surface of the gaming machine. Typically, a small slot, a surrounding bezel and a landing area for placing bills or tickets are all that is provided. However, a candle device upon receiving an indication of a transaction from a secondary device, such as bill validator, can be configured to generate a display interface on a touch screen display associated with the gaming machine. The candle controller can output content to the display interface and respond to touch inputs received via the display interface in a manner that allows verification information associated with the transaction to be received and a status of the transaction to be displayed to a player. As described above, the candle can generate the display interface without the participation of the game controller.

Next, after receiving information via the verification interface, the candle 2 can send the account identification received from the bill validator and the verification information received via the verification interface to a casino server. The casino server can include account information that allows the server to determine if the verification information received from the candle device matches the verification information associated with the account. If necessary, the casino server can be configured to contact other remote devices via outside interface and request account verification where the request includes verification information entered via the display interface generated by the candle. In response, the remote devices can determine whether the verification information is valid or not and communicate the validity of the transaction to the casino server. Then, the casino server can notify the bill validator, via the candle whether the transaction is valid or not.

In one embodiment, the casino server can include an alternate communication mode associated with the account, such as an e-mail address. The candle, such as 2_a_ or 2_b_, or other secondary processor can be configured to send biometric information about the person requesting the transaction, such as a captured image of the person to the server. In response to receiving the biometric information, the server can be configured to send a message including the biometric information (e.g., the captured image of the person requesting the transaction via) the alternate communication mode. For instance, the message might indicate that a transaction associated with the account has been performed by the person in the captured image. If an authorized person is performing the transaction, then the message receiver can respond back to the server. In response to receiving the indication that the transaction is not valid, the server may freeze the account and send the captured image to security. Then, if the person in the image attempts another transaction, security can be notified and the person can be identified by the captured image data from the previous transaction.

Other examples of servers that can receive data streams from the system controller 101 include but are not limited to the player tracking server 24, the WAP (Wide Area Progressive) server 25, link progressive server 26 and the TITO (Ticket-in/Ticket-out) server 27. These servers can communicate with one or more of the gaming machines by routing communications through the system controller 101.

A few other examples of servers that can be coupled to the wireless gaming network 102 via the system controller 101 can include servers in other gaming establishments, servers associated with gaming regulators, third-party servers, servers providing game downloads and peripheral software updates, security server, servers providing hotel hospitality, travel, weather and lodging information and outside access to servers via the Internet. As an example of a server in another gaming establishment, the system controller 101 can be configured to contact a remote TITO server in another gaming establishment to validate a printed ticket remotely issued outside of the gaming establishment in which the system controller is located and forward the validation information to a gaming machine. As an example of a communication with a gaming regulator, the system controller 101 can be configured to communicate with a gaming regulator to notify the regulator of a regulated change to a gaming machine, such as a change in regulated gaming software on the gaming machine.

Gaming operators can allow third-parties affiliated with a gaming establishment to provide promotional opportunities to players on gaming machines. The system controller 101 can be configured to communicate with a gaming machine to provide a third party promotional opportunity. As an example, via the system controller 101 and the wireless gaming network 102, a ticket can be printed at the gaming machine that allows a discount on a merchandise item or a service provided by the third party. In some embodiments, the tickets can be customized using a format selected by the third party and approved by the gaming operator.

The system controller 101 can be configured to allow a remote server to communicate regulated or unregulated gaming software to a gaming device. Regulated gaming software typically includes logic related to generating a wager-based game on the gaming machine, such as determining an outcome and an associated award. An example of unregulated gaming software may include firmware used by a peripheral device, such as firmware used by a bill validator or printer to report information used for health monitoring, firmware used by a bill validator to detect fraudulent currency or firmware used by a printer to print customized tickets. If the bill validator accepts a bill or an instrument that is later determined to be counterfeit, then new software can be downloaded to the bill validator to detect other bills or instruments with similar characteristics so that additional counterfeit bills or instruments are not accepted. The system controller 101 can also be configured to transmit and receive verification information that allows a remote server to verify that authentic software has been installed on a gaming device, such as gaming machine.

Each gaming machine can be connected to a different combination of gaming system servers, such as but not limited to a player tracking server 24, WAP server 25, link progressive server 26, and the TITO Server 27. For instance, a first gaming machine can be connected to only the casino back-room server 107 while a second gaming machine can be connected to the player tracking sever 24 and the TITO server 27. The system controller 101 can be configured to allow different gaming machines to receive different data streams depending on a current server connection configuration. A current connection configuration for a particular gaming machine, such as adding a new connection to a server or removing a current connection to a server can be implemented via operator communications with the system controller 101.

The system controller 101 can be configured to provide the multiplexing of the data streams from the gaming system servers and then encrypt the resultant data stream before transmitting. The data streams can be encrypted to prevent tampering and misuse of any data sent in the data streams. The wireless gaming network 102 may use one or more common wireless technologies such as Zigbee, 802.11 a/b/g/n, and 3G/4G. Also, optical transmission technologies, such as IR and laser, can be utilized alone or in combination with other transmission technologies. In other embodiments, power-line transmission technologies or other wired communication technologies can also be utilized alone or in combination with one or more different wireless technologies as part of a gaming network.

Existing gaming systems typically use some form of a protocol stack. There are standard gaming protocols, such as S2S, G2S developed by the Gaming Standards Association (GSA) and SAS developed by IGT as well as many other proprietary protocols used in the gaming industry. The protocols are used by gaming systems, such as a player tracking system or a TITO system, to communicate data between the gaming machine and servers across a network. The gaming systems may also use encryption to protect data in transit. All of the gaming system's protocols and encryption techniques must be tested and approved by a gaming test lab and/or gaming control board to operate in their jurisdictions. In order to maintain integrity and security it is important not to tamper with or change the data streams of these gaming systems. The gaming system including the system controller 101, the wireless network 102 and candle devices 2*a* and 2*b*, can be configured to provide a non-intrusive technique to transmit and receive the data provided by these various systems, i.e., without a modification to an existing protocol that would require additional testing and approval.

In yet another embodiment, a back room server 107 and a gaming table 108 can be added to the system. The back room server 107 can be used to provide some of the real time changes to the entertainment, informational and promotional opportunities available on a gaming machine, such as 1, or on a gaming table, such as 108. For instance, promotional tickets can be printed at gaming tables and gaming machines in a dynamic manner using the back room server 107. As another example, tournaments or other group games can be provided using the back room server 107.

Figure 6:
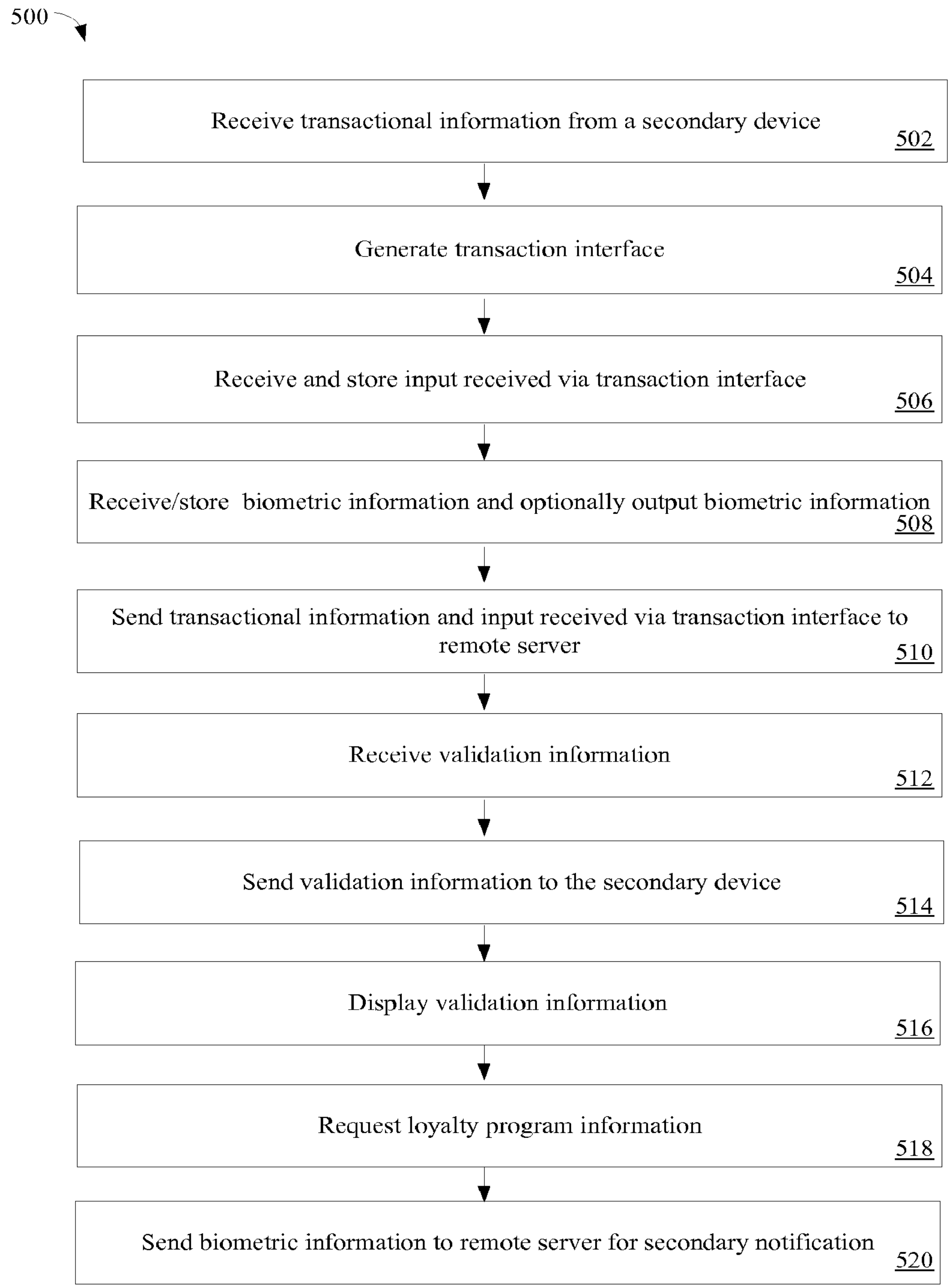
FIG. 6 is a flow chart of a method for verifying transactions in accordance with the described embodiments.

Next, further details of transaction verification using a display interface generated by a candle device are described. FIG. 6 is a flow chart of a method 500 for verifying transactions using a secondary processor, whether in a candle device or in the cabinet of a gaming machine. In 502, the secondary processor can receive transactional information from a peripheral device. The transactional information can be included in a request to verify a transaction associated with the transactional information. The transactional information can be sent via a communication pathway that by-passes the game controller. Thus, this verification process can be transparent to the game controller.

For instance, a bill validator on a gaming machine can receive transactional information from a smart phone. The transactional information can include an account identifier and a request to withdraw a particular amount of funds from the account associated with the account identifier and convert the funds to credits on the gaming machine. In one embodiment, the bill validator can request the candle device to provide an interface for entering verification information associated with the transaction. The bill validator can be a dual port bill validator that communicates with the game controller through a first port and the candle device through a second port where each port is coupled to a separate communication channel. The communications through the second port between the bill validator and the candle device can by-pass the game controller.

In 504, the secondary processor can generate a transaction interface on the main touch screen display of the gaming machine. While the transaction interface is being generated, the game controller is also outputting game content to the display as well. The generation of the transaction interface can include determining a size and a position of a window for outputting the game content and a size and a position of a window for outputting the content associated with the transaction interface. After the determination, control commands can be sent to the display from the secondary processor relating to the windows. Prior to the control commands, the game content can be displayed in a first window of a first size on the display, such as the entire display, after the control commands, the game content be displayed in a second window of a second size on the display that is smaller than full size.

The video content for the transaction interface can include a number of buttons that indicate locations where a touch can be made to enter information. For instance, key board buttons can be displayed to enter letters and buttons with numbers can be displayed to enter letters. One or more numbers, letters (upper and/or lower case), symbols (e.g., exclamation point or question mark) and combinations thereof can be entered when touches are detected at locations on the touch screen corresponding to the locations of the buttons output to the display. The information that is entered can be used to validate a transaction. For instance, a PIN can be entered and then compared to a PIN associated with an account before a transfer of funds from the account is authorized.

In 506, the secondary processor can receive touch inputs from the touch sensor and determine whether the touch inputs correspond to particular input buttons that are displayed. When the touch input is determined to be associated with an input button then the secondary processor can be configured to change the video content output to the display associated with the interface and/or output a sound to an audio device. For instance, when selected, a color of a touch button may change and/or clicking noise can be output from the audio device, such as a speaker coupled to the candle device.

In 508, the secondary processor can be configured to gather biometric information of the person requesting the transaction. In one embodiment, an image capture device can capture an image of the person requesting the transaction. In one embodiment, the biometric information that has been gathered can be output. For instance, an image of the person requesting the transaction captured via the camera on the candle device can be output to the main display.

In 510, the secondary processor can send to the remote server the transactional information, such as an amount of funds and the account from which to withdraw the funds. The transaction information can be received from a secondary device, such as a bill validator. The bill validator may have received the transaction via an NFC enabled communication between the bill validator and a portable electronic device. In addition, the secondary processor can send the input entered via the transactional interface, such as a PIN or a password including numbers, letters, symbols or combinations thereof and optionally biometric information to the remote server. In the message including the data, the candle device can request the remote device to validate the transaction based upon the information that the secondary processor sends to the remote device.

In one embodiment, the remote device can store account information for a casino account. A player may have previously established and deposited funds into the casino account. The player can carry an account identifier for the account on their portable electronic device which can be read wirelessly from a secondary device, such as the bill validator. Via an interface on their portable electronic device or the verification amount generated by the candle, the player can request an amount of funds to transfer from the account to the gaming machine. An advantage of transferring funds in this manner is that the gaming machine doesn't have to accept and store a ticket voucher, which can potentially lower operation costs.

The casino account can include secondary contact information for the player, such as an email. When transaction verification is requested, the remote server can be configured to send a message using the secondary contact information indicating a transaction has been requested. In one embodiment, the message can include biometric information, such as an image of the person requesting the transaction. The image of the person can be capture using an image capture device located on the candle device. Alternatively, the remote server can send the secondary contact information to the secondary processor which can generate and send the message indicating a transaction has been requested via the secondary contact information. For instance, an e-mail message, text message or voice message can be sent to the user associated with the account. The text message or voice message can be sent to a phone number that is different from a number of a portable electronic device used to initiate the transaction.

In another embodiment, the account information received from the player's portable device can be for an external account, such as a debit card. The funds can be associated with the debit card, i.e., a particular amount associated with the card or the funds can be linked to an account, such as bank account. The verification information that is received via the verification interface, such as a PIN, can be sent to a casino server. The casino server can then contact a remote device such as a remote device associated with a financial institution for verification and approval of the transaction. In another embodiment, the secondary processor can be configured to directly contact the remote device for verification. An advantage of routing all of the verification and transaction approvals through a single casino server is that the access points to the internal casino network are limited because all of the transaction requests are routed through a single casino server.

For a transaction, such as the debit card transaction described above, when a user can be identified with the transaction, the candle device can be configured to determine whether the user associated with the transaction is registered in the loyalty program and whether the loyalty program account stores secondary contact information for the user. When the candle determines secondary contact information is available, it can generate a message indicating an attempted transaction has been made via the communication mode associated with the secondary contact information. As described above, the message can include biometric information, such as an image of the person attempting the transaction, as well as transaction information received, such when, where and what type of transaction was attempted.

In 512, the candle device can receive touch sensor data from the main display and determine what information has been entered, such as a PIN or a transaction amount. In response to receiving the verification information, the candle device can also attempt to gather biometric information. For instance, an image capture device on the candle can be used to take a picture of the person initiating the transaction. In 514, the verification information can be sent to a remote device where the remote device determines whether the transaction is to be authorized based upon the verification information. In another embodiment, the candle device can request verification information from the remote device based upon the account information received from a secondary device, such as a bill validator. Using the verification information received from the remote device and the verification information received from the interface, the candle can compare the information and determine whether the transaction is valid.

In 516, the candle device can display to the verification interface a transaction status, such as transaction verification in progress. When the verification of transaction is complete, the candle device can display whether the transaction has been authorized or not. Next, the candle can close or display alternate content in the verification interface. When the verification interface is closed, the candle device can resize the window that is used to display the game content. For instance, the window can be enlarged to fill the entire display as opposed to a portion of the display. In one embodiment, a player can register secondary contact information in a loyalty program account with the casino.

Figure 8:
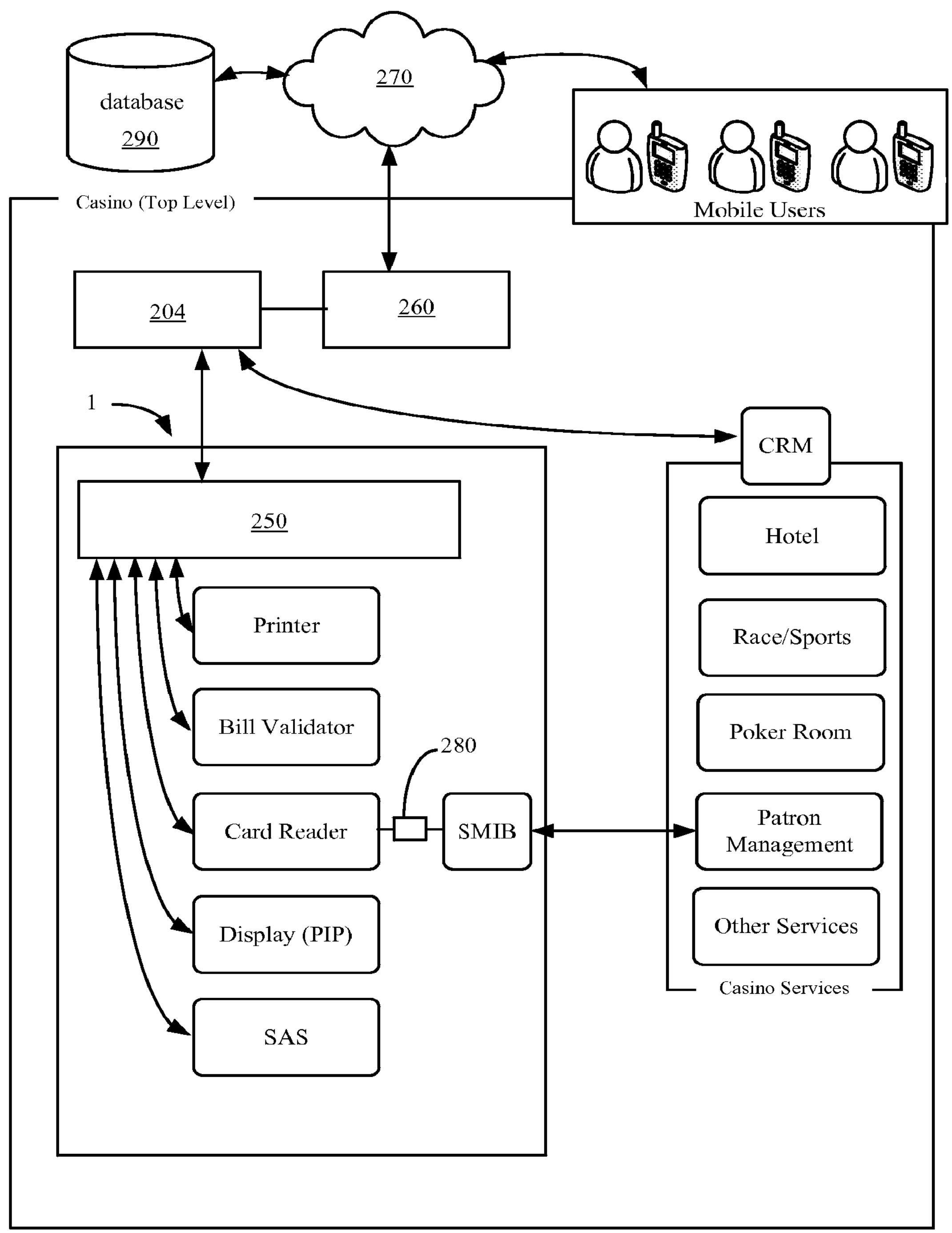
FIG. 8 is a block diagram of a gaming system in accordance with the described embodiments.

According to an embodiment, a player does not need to carry a physical loyalty card in order to participate in the loyalty program while engaged in game play. Instead, the player can participate in the loyalty program via a mobile application on the player's mobile electronic device 240, such as a smartphone, tablet computer, etc. According to an embodiment, a player can first "virtualize" his or her traditional plastic physical loyalty card to create a "mobile loyalty card," which can then be used to track the player's game play at electronic gaming machines 1 throughout the casino's network. It will be understood that the mobile electronic device 240 can communicate with the electronic gaming machine 1 wirelessly, and that the electronic gaming machine 1 can communicate wirelessly with a remote server 204, as shown in FIG. 8. In some embodiments, the wireless communication can take place via the candle 2. The mobile loyalty card can be created using an application on a portable electronic device 240.

The mobile loyalty card can then be used wirelessly via the application on the portable electronic device 240 to initiate tracked play at an electronic gaming machine 1 or an electronic gaming table (not shown) and the player can also use the mobile application on the portable device 240 to view statistics of the player's game play from electronic gaming machine 1 to electronic gaming machine 1 and even from casino to casino. In an embodiment, the system can include a remote server 204 that can be securely connected to electronic gaming machines 1 in the casino. The secure connection between the electronic gaming machines 1 and the remote server 204 can be either wireless (e.g., via the candle 2) or wired. The electronic gaming machines 1 can include components, such as a game controller, card reader, printer, and SAS. Other services can also be made inside the casino that can interface with the electronic gaming machines 1 and/or the server 204. In some embodiments, the mobile system can function across geographic regions and/or cross-regulated area such that a user can have a seamless experience using the same mobile loyalty card on his or her smartphone when traveling across geographic regions, such as from Las Vegas to California.

With reference to FIG. 8, the remote server 204 can be securely connected to electronic gaming machines to transmit and receive information to and from the electronic gaming machines 1. The remote server 204 can be connected to a processor 250 inside each electronic gaming machine 1 via a secure wired or a wireless network connection. The processor can be associated with a gaming device which is separate from the game controller, such as a candle device or the gaming device 700 described below with respect to FIG. 16. External scalable secure mobile services 270 can interact with the mobile loyalty card application on a player's portable electronic device 240. The system can also include internal mobile services 260 within a casino for securely connecting the remote server 204 with external mobile services 270. The processor 250 can read and write to existing systems (e.g., printer, card reader, bill validator, etc.) in the electronic gaming machine 1 without interfering with their existing purposes. Furthermore, the processor 250 can also interface with other peripheral devices of the electronic gaming machine 1, such as a video screen, SAS, speakers, buttons, and other devices.

Figure 9:
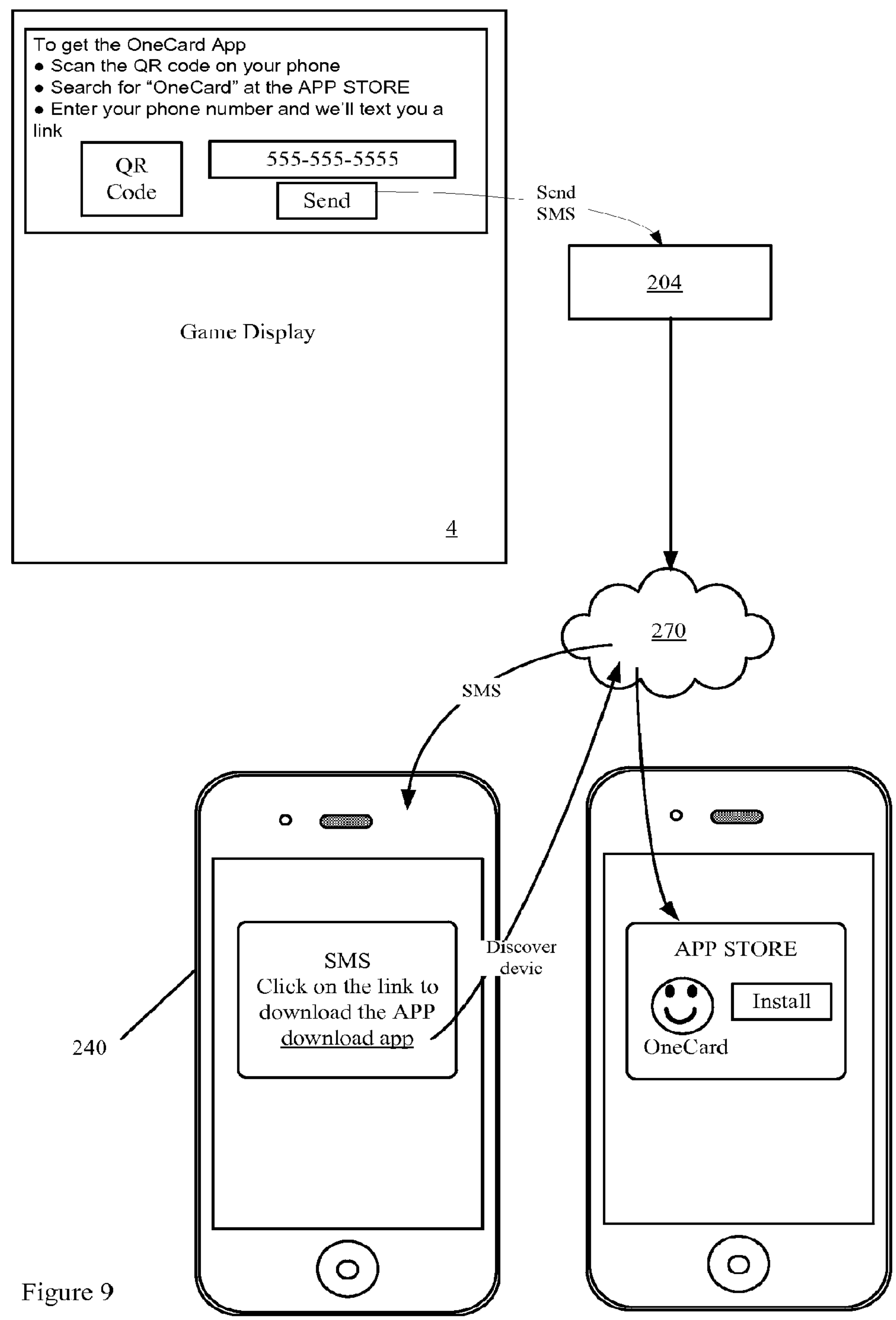
FIG. 9 shows some exemplary methods of acquiring the mobile application for use with a mobile loyalty card.

The mobile application can be acquired by the user using a variety of methods. FIG. 9 shows some exemplary methods of acquiring the mobile application. For example, the user can download and install the application to his or her portable electronic device 240 after the user finds the application when searching for it in an AppStore or Marketplace in external mobile services 270. The application can be compatible with a mobile operating system such as iOS or Android. Alternatively, the user can scan a QR code or other optically formatted image data displayed on an electronic gaming machine screen, such as a touch screen display 4 as shown in FIG. 9, and the QR code directs the user to the application in an AppStore or Marketplace via an Internet link. The user can then click on the link to install the mobile application.

According to another method shown in FIG. 9, the user can enter his or her mobile phone number on the electronic gaming machine 1, which sends the phone number to the remote server 204, and a text message is then sent to the user's portable device 240 with an Internet link (or some other type of network address) directing the user to the application in the App Store or Marketplace in external mobile services 270. Once the user clicks on the link and finds the application, he or she can install it on the portable electronic device 240. A casino host or other personnel can also assist the user in installing the application on the user's portable electronic device 240.

Figure 10:
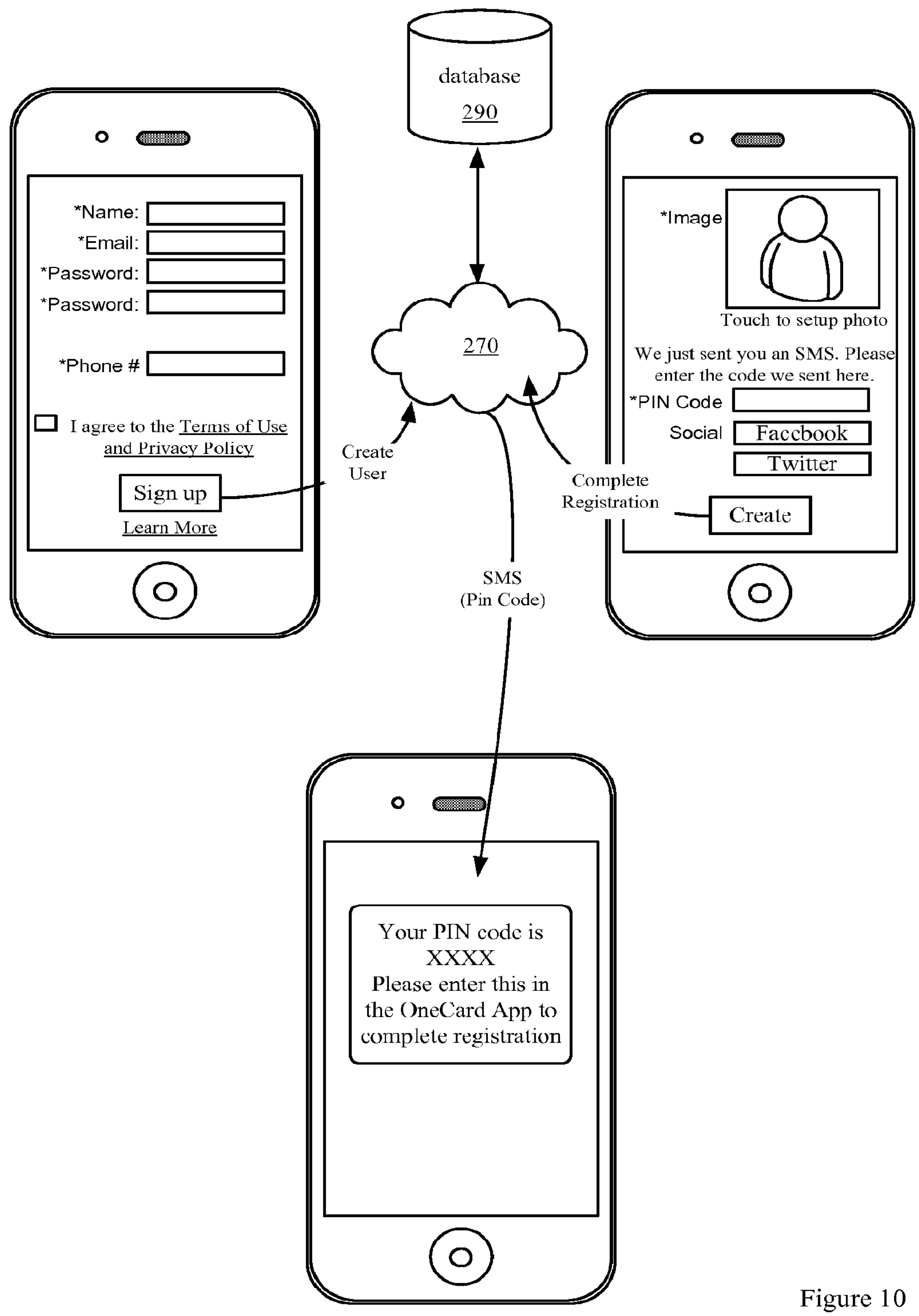
FIG. 10 shows an embodiment of a method of setting up a mobile loyalty card account.

Once a user acquires the mobile application on his or her portable electronic device 240, the user can create and configure a mobile loyalty card account. FIG. 10 shows an embodiment of a method of setting up a mobile loyalty card account. For example, the user can set up his or her username and password and also enter his or her email address to be associated with the account. This information is transmitted from the user's portable electronic device 240 to external mobile services 270 and can be stored in a database 290. The user can also view and agree to the terms of the use and privacy policies for the virtual card and the mobile application.

According to an embodiment, in addition to setting up the account, the user can also upload a picture to the mobile application via mobile services 270, as shown in FIG. 10. The picture can be, for example, a photograph of the user and can be used as a security feature when the user logs into his or her account. In an embodiment, the user can either touch a photo icon on the touchscreen of his or her portable electronic device 240 to take a photograph of himself or herself, or the user can download an existing photograph from a photo roll on the portable device 240. Alternatively, the picture chosen can be something the user selects to be identified with his or her virtual card and to use as a security check. In an embodiment, the user can also associate other social media accounts (e.g. Facebook, Twitter, Google+ etc.) with the virtual card account via external mobile services. According to an embodiment, external mobile services 270 can send a PIN code to the user's portable electronic device 240 and the user can complete the registration by entering the PIN code in the application. Besides a PIN, which consists of numbers, other types of codes including letters and symbols can be used. It will be noted that the mobile users can be either inside or outside the casino when acquiring the mobile application and/or setting up his or her account.

Figure 11:
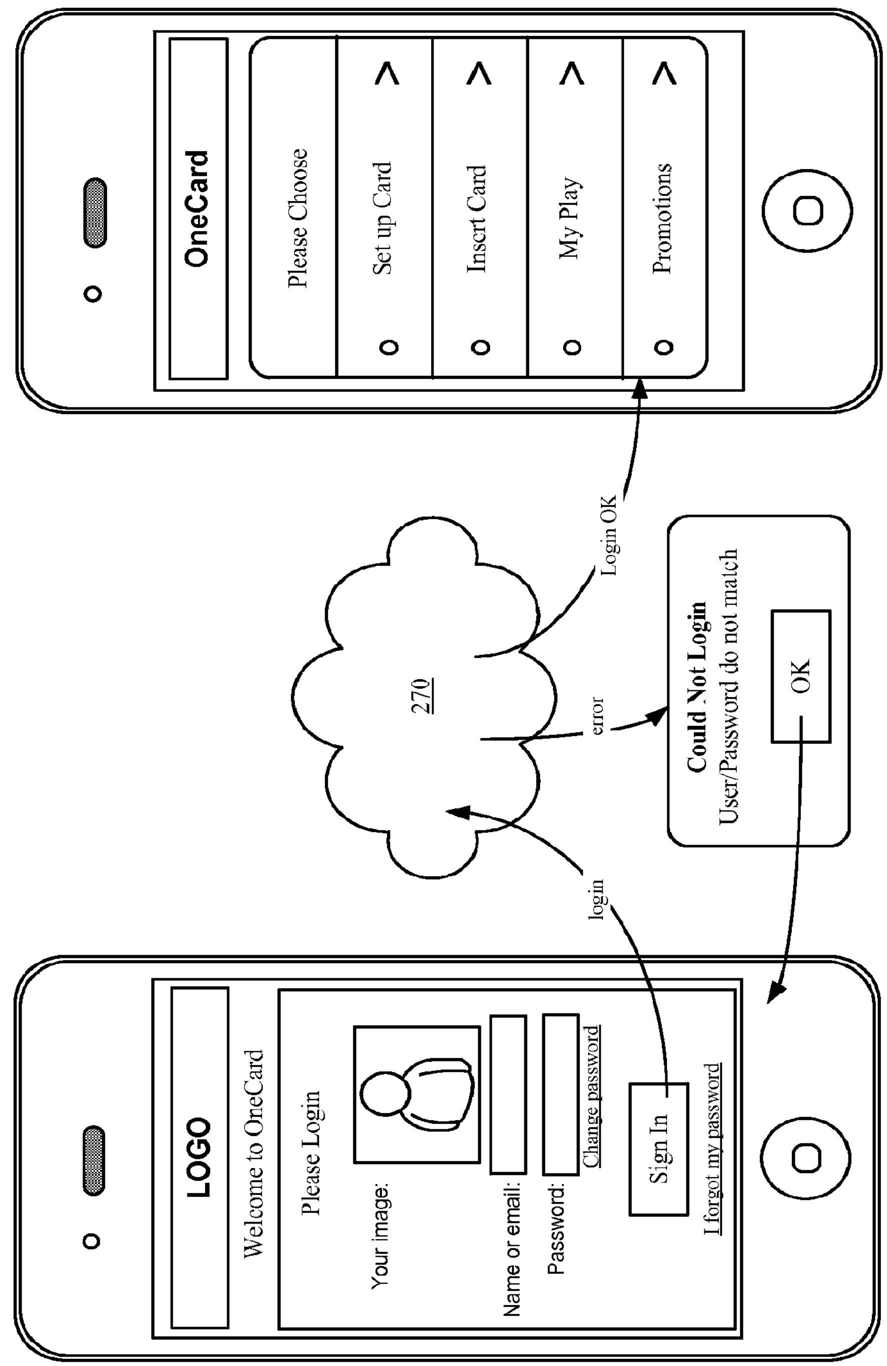
FIG. 11 illustrates an exemplary method of virtualizing an existing player loyalty card.

Once the account set up is completed, a user can sign in to virtualize his or her existing player loyalty card by associating the existing player loyalty card with the newly set up account. FIG. 11 illustrates an exemplary method of virtualizing an existing player loyalty card. If the electronic gaming machine 1 detects a mobile device 240 that is recognized by data stored in the database 290, the picture selected by the user can be transmitted to the portable electronic device 240 so that it can be displayed on the device 240. The user can then use it as a check to see that the correct picture is displayed to ensure security. The user can log in to the account by entering his or her username and password. In addition or in lieu of a username and password a user can provide biometric information, such finger print information. If an incorrect username or password or username/password combination is entered, a message can be sent to the mobile device 140 indicating an error, as shown in FIG. 11.

Figure 12:
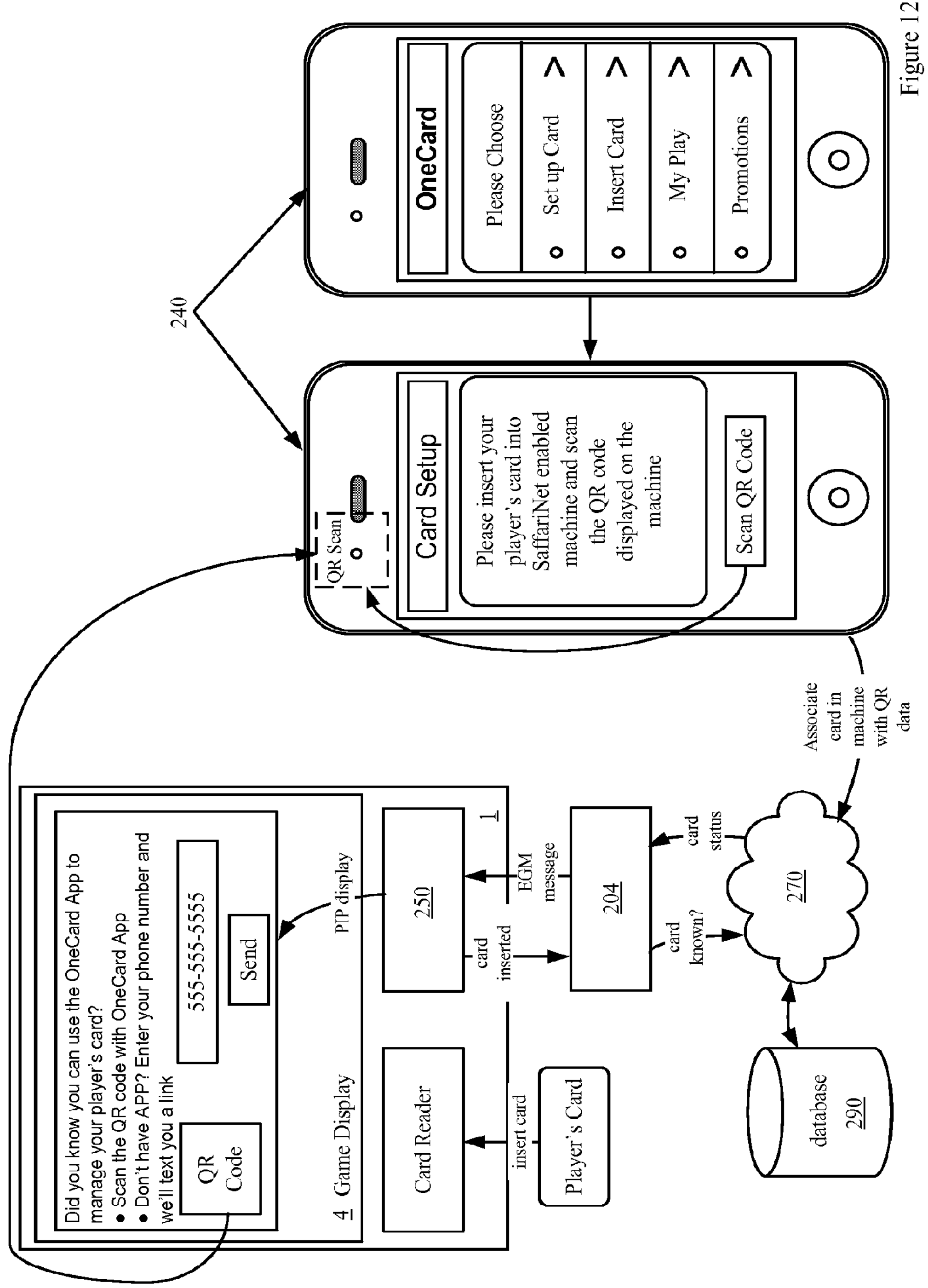
FIG. 12 illustrates an exemplary method of associating an existing player loyalty card with a newly created mobile loyalty card account.

At the electronic gaming machine 1, the user can virtualize his or her existing player loyalty card by associating it with the account to which the user has created. According to an embodiment, when an electronic gaming machine 1 detects the presence of a portable electronic device, a picture-in-picture (PIP) display can appear in a display of the electronic gaming machine 1 to advertise the mobile loyalty card application, as shown in FIG. 12. This PIP display can advertise the mobile application sign-up process.

According to another embodiment, the PIP display advertising the mobile application sign-up process can appear after a player inserts his or her player loyalty card into the card reader on the electronic gaming machine 1 if the system does not recognize the card. If the player inserts the card into the card reader and chooses to associate the card on the mobile application, the card reader can send the data stored on the magnetic stripe on the card to external mobile services 270 via the processor 250 (and internal mobile services 260). The data can be stored together with the electronic gaming machine and property identification information in the mobile services database 290.

Figure 13:
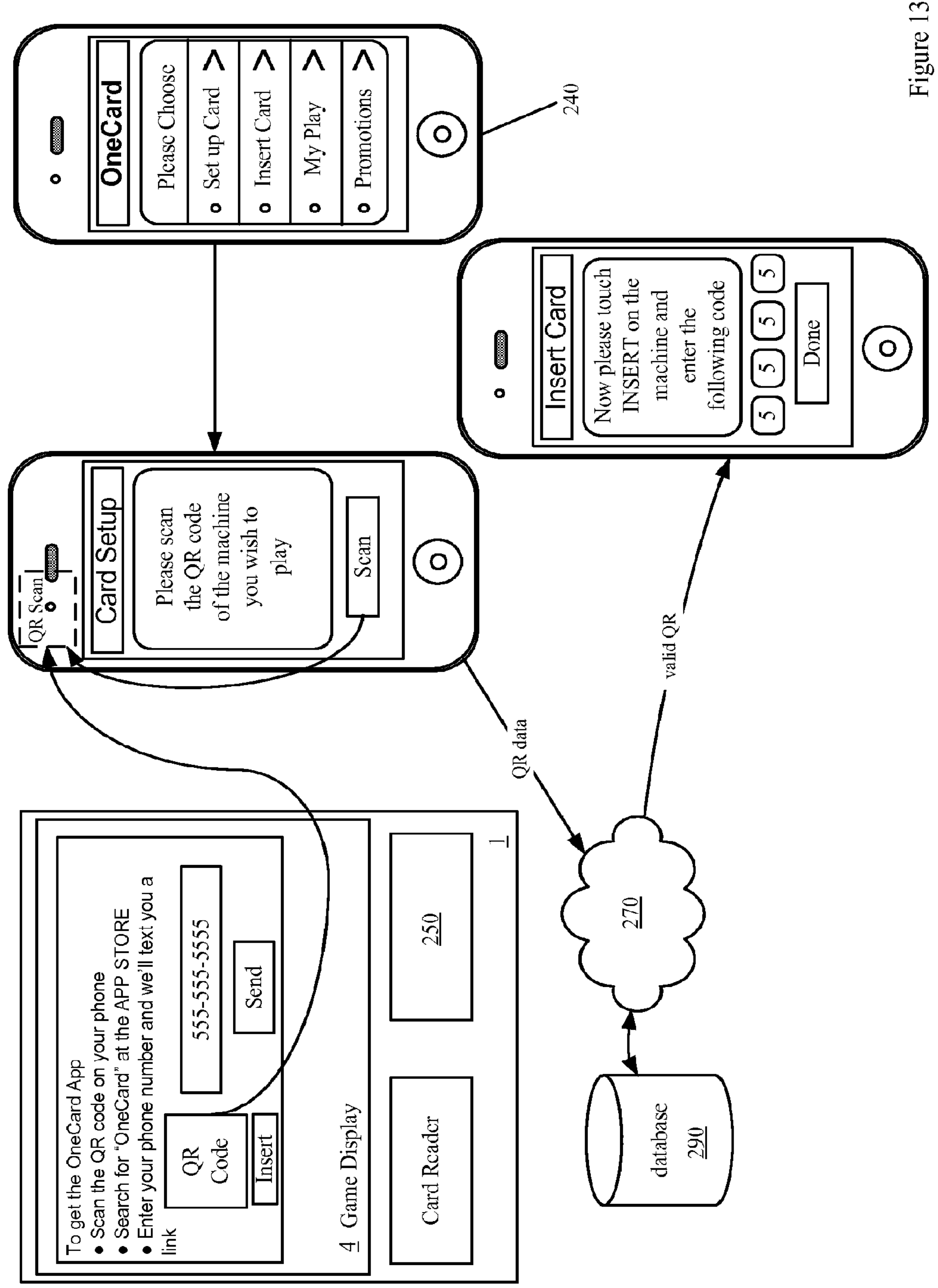
FIGS. 13 and 14 illustrate an exemplary method of virtual insertion of a mobile loyalty card.

The mobile application can also ask the player to use his or her portable electronic device 240 to scan the QR code on the electronic gaming machine display 4, as shown in FIG. 13. When the QR code is scanned, the QR code can contain the same electronic gaming machine and property identification information so the loyalty card magnetic stripe data already stored in the database 290 can be associated with a particular mobile device 240.

Once a player's account has been set up, the virtual mobile loyalty card can be virtually inserted into an electronic gaming machine 1 by scanning the QR code on the electronic gaming machine 1 with the player's portable electronic device 240. In one embodiment, as illustrated in FIG. 13, the player can choose to "insert card" on either the mobile application or the electronic gaming machine display 4 to virtually insert the mobile loyalty card. The mobile application and/or the electronic gaming machine 1 can ask the mobile user to scan the QR code on the electronic gaming machine 1. Alternatively, the player can scan the QR code on the electronic gaming machine 1 after selecting "insert card" on either the mobile application or the electronic gaming machine 1 to virtually insert the mobile loyalty card.

Figure 14:
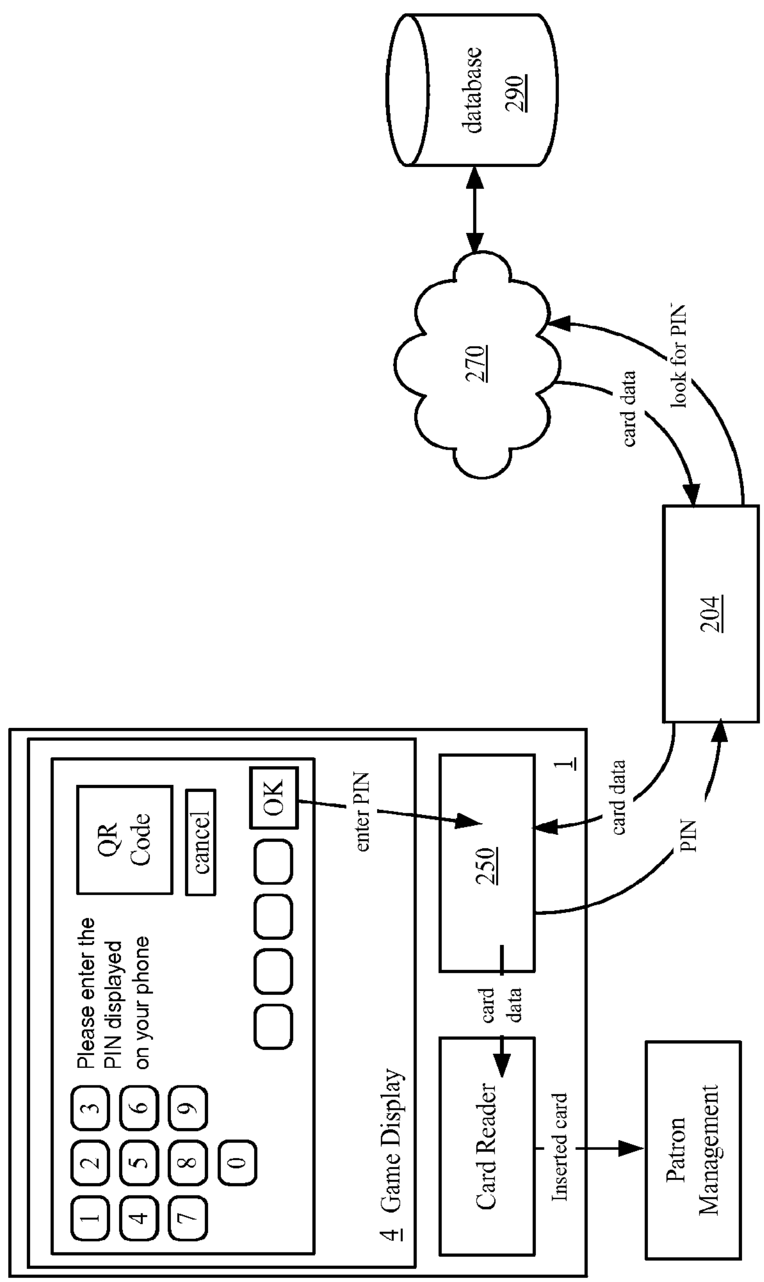

According to an embodiment, as illustrated in FIGS. 13 and 14, the virtual insertion of the mobile loyalty card is not complete until the user enters a code, such as a PIN, that is sent to the user's portable electronic device 240 and the user can be asked to enter the same code on the electronic gaming machine 1. In some embodiments, the code expires after a period of time (e.g., two minutes or five minutes). If the code has expired, the user may have to start the virtual insertion process again in order to complete the virtual insertion of the mobile loyalty card.

As shown in the embodiment in FIG. 14, when the code is entered on the electronic gaming machine 1 by the user, the processor 250 can send the code to the remote server 204 to match the code with the currently active codes. If the code matches, the player data associated with the mobile loyalty card is sent back to the processor 250 of the electronic gaming machine 1. The processor 250 can then send the card data to the card reader which can transmit the data to the patron management or player tracking system.

When the mobile loyalty card is virtually inserted into an electronic gaming machine 1, hardware 280 (FIG. 8), such as a spoofing device, can send or block signals to the Slot Machine Interface Board (SMIB), which is connected to the patron management or player tracking system. The spoofing device 280 can be activated by the processor 250 when a mobile loyalty card is virtually inserted into the electronic gaming machine 1. As shown in FIG. 8, the spoofing hardware 280 can be operably connected to both the card reader of the electronic gaming machine 1 and the patron management or player tracking system. The sending and/or blocking of signals by the spoofing hardware 280 to the patron management or player tracking system can mimic the signals that would be sent by the SMIB to the patron management or player tracking system when a traditional plastic physical loyalty card is inserted into the card reader. For example, the spoofing device 280 can block signals from the card reader to the patron management or player tracking system that indicate no player loyalty card is inserted into the card reader. Instead, the spoofing device 280 can send signals to the patron management or player tracking system indicating that a card is inserted into the system. Data associated with the mobile loyalty card that has been virtually inserted can also be sent to the patron management or player tracking system via the SMIB by either the processor 250 or the spoofing device 280. It will be understood that, for simplicity, the spoofing hardware 280 and the SMIB are not shown in FIG. 14.

When the mobile loyalty card is virtually inserted into the electronic gaming machine 1, the player's play can be tracked and the electronic gaming machine 1 can display the associated player information (e.g., photograph, name, etc.) on the electronic gaming machine display 4 and/or mobile application. Game play can be tracked by the processor 250 and events from the electronic gaming machine 1 can be sent by the processor 250 to the mobile network together with the electronic gaming machine 1 and casino identification information.

As noted above, after the mobile loyalty card is virtually inserted, features, such as, for example, coupons, promotions, and other advertisements, can also be presented to the player via the mobile loyalty card. Such features can be presented on the mobile application and/or the electronic gaming machine 1. Once a player's physical loyalty card is associated with his or her portable electronic device 240, the player may be able to view a list of current promotions or coupons that can be redeemed at the electronic gaming machine 1. The list of current promotions can be displayed on an electronic gaming machine 1 display or on the portable electronic device 240. These promotions and coupons can be customized for a particular player. The player can also receive notifications about new promotions that can be pushed to the portable electronic device 240 even when the mobile application is not open on the portable device 240. The player can also view the current status of his or her player points for each of the cards associated with the account. The player can also view daily/weekly/monthly summary of games played, machines played, etc.

Furthermore, a feature can be presented to just the player or to all registered users of the mobile application or just to certain groups of users. For example, the mobile application can notify users' smartphones that free play is available and when these users next associate their phones with electronic gaming machines 1, the free play can be either printed as a coupon or credit can be added directly to the electronic gaming machine 1. Other casino redeemable coupons, such as, for example, coupons for prizes, giveaways, or services (e.g., a free buffet or 20% off a spa treatment) at the casino can also be supported. The mobile loyalty card can be virtually removed when a player plays to zero credits or cashes out of the electronic gaming machine 1.

Figure 15:
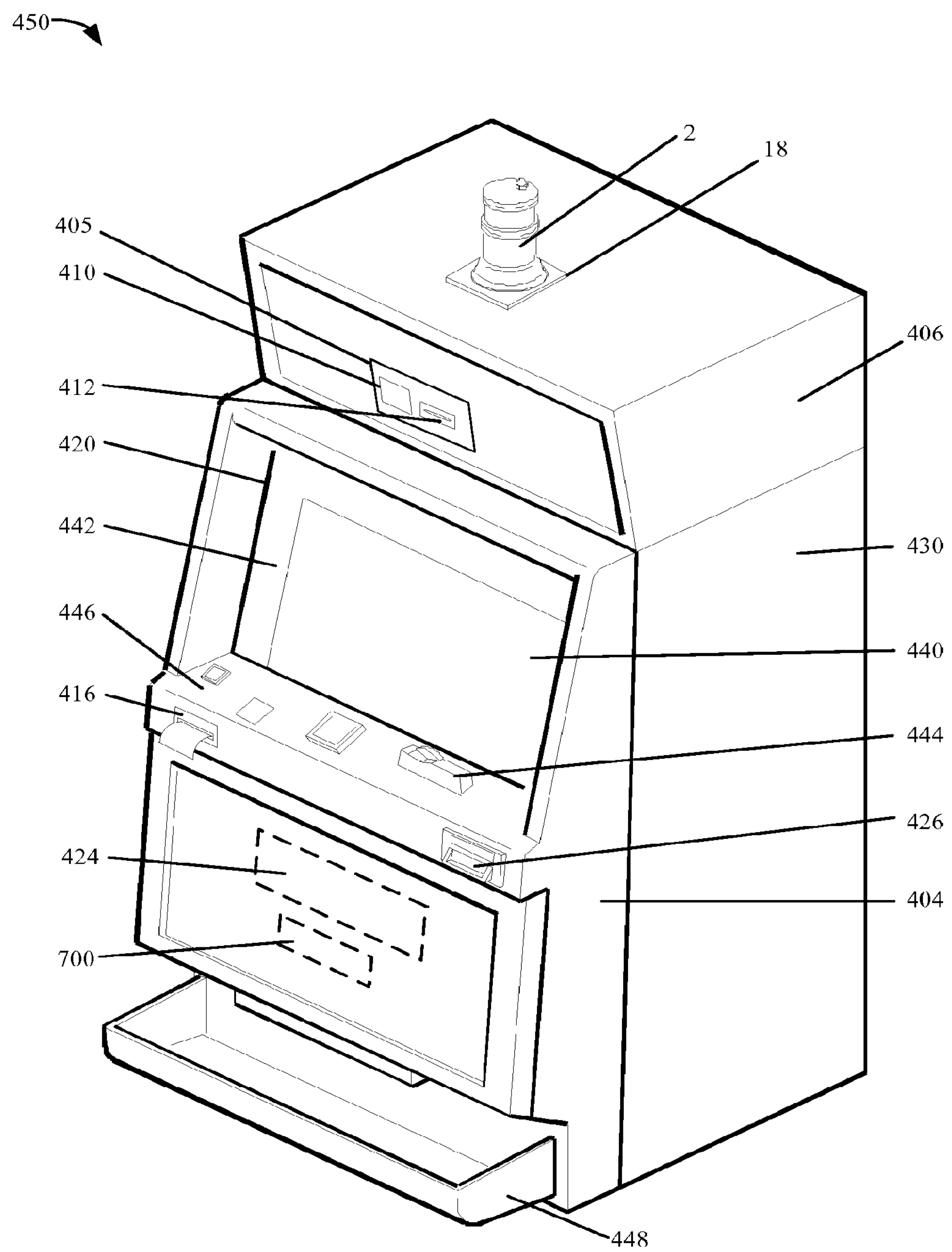
FIG. 15 is a perspective drawing showing exterior portions of an electronic gaming machine in accordance with the described embodiments.

FIG. 15 is a perspective drawing showing exterior portions of an electronic gaming machine 450. A radio candle mount 18 is disposed between a candle 2 and a top portion 406 of an EGM cabinet. In this example, the top portion 406 is a top box. In various embodiments, EGMs can include or not include a top box. The radio candle mount 18 may have been installed when the EGM 450 was manufactured or as part a subsequent retrofit process. A controller associated with a secondary gaming device 700 or an EGM controller 424 can be coupled to and configured to use the one or more wireless interfaces associated with the radio candle mount 18. In one embodiment, the secondary gaming device 700 and EGM controller are mounted within an interior of the EGM 450.

The gaming machine 450 can be used to play a wager-based game. The wager-based game can be generated under control of a game controller disposed within a main cabinet 430. The door 404 can be opened to provide access to an interior of the EGM. As described above, one or more secondary gaming devices, such as described with respect to FIGS. 1 and 16 can be disposed within the interior of the EGM.

The gaming machine can include a player tracking panel 405 (e.g., a display 410, a card reader 412 and/or a key pad (not shown)) for performing player tracking transactions, a monitor or reel area 420 for displaying the wager-based game, a player input panel 446 (generally having buttons) for making selections associated with the play of the wager-based game, such as for inputting game related decisions and wager amounts, a coin-in acceptor 444 for accepting coins, a bill acceptor 426 for accepting bills, printed tickets and/or cashless media, a coin-out device (hopper) for outputting coins and/or tokens to tray 448, and a ticket printer 416 for generating cashless or promotional tickets. In addition, the ticket printer 416 can be used to generate other types of printed documents, such as receipts, boarding passes, tax forms, lottery tickets, keno tickets, etc.

Many different types of EGMs including tables used for table games can be equipped or retrofit with the radio candle mount 18 and secondary gaming devices as described herein and the EGMs are not limited to the example shown in FIG. 15. The EGMs can have different combinations of devices than those shown in FIG. 15. For instance, some EGMs may not include a coin acceptor or a coin hopper. Further, different types of gaming machines, such as class II bingo type EGMs or lottery terminals can also be equipped with the radio candle mounts and/or secondary gaming devices described herein.

The EGM 450 can have a game controller 424 disposed within a locked enclosure. The game controller 424 can be configured to control a wager-based game played on the gaming machine including receiving wagers on the outcome of a game. The game controller can include a random number generator that is used to determine outcomes. In addition, the game controller can be connected to a number of devices that are used during operation of the gaming machine. For instance, the game controller can be communicatively coupled to the candle 2, the monitor 420, the printer 416, the bill/ticket acceptor 426, the player input panel 405, the coin-in (acceptor) 444, the coin-out (hopper) 432 and the audio system 418. The candle 2 can be one of the enhanced candles described above or can be a more basic candle with limited functionality.

The game controller can be configured to send commands to the peripheral devices that control their operation and receive data, such as acknowledgement of the commands from the peripheral devices in response. The game controller can execute regulated gaming software to perform these functions. The game controller can also access various network interfaces that allow the game controller to communicate with external devices. For example, the player tracking panel 405 can include a player tracking communication interface (SMIB 810 in FIG. 17) which can be used by the game controller to communicate with external devices. Also, the communication interfaces can be separate from a player tracking unit.

In one embodiment, the monitor 420 can be a touch screen display. The display can be configured to receive video content from each of the game controller and a secondary gaming device described above. For example, first content from the game controller can be displayed on portion 440 of the display 420 and second content from a controller in the secondary gaming device can be displayed on portion 442 of the display 420.

In one embodiment, the controller 60 associated with the display 420 can be configured to receive sizing, scaling and positioning commands that allow content received from multiple sources to be displayed in different portions of the display. In another embodiment, a secondary gaming device, such as 700 in FIG. 16 or 2 in FIG. 1, can include a controller for performing these functions.

The sizing, positioning and scaling commands can result in content sent to the display 420 to be output in a stretched or a compressed format relative to the native resolution in which content the content is generated. For example, video content output from a game controller in a native format can be stretched or compressed. As described above, one or more of the controllers on the EGM can be configured to generate translation functions for the video input and for the touch screen output that interpolates the video input to fit within a designated display area and interpolates the touch screen output to account for positioning and scaling commands received from an external device.

The touch screen display 420 can be the main display the gaming machine 450 where video content associated with a wager-based game generated by the game controller is displayed. The game controller can be configured to output the video content in a native resolution, such as 640 by 480. The native resolution can vary from EGM to EGM. The video content can include indications of locations where a touch detected by a touch screen can cause the game controller to perform an action in response. For instance, in response to a detected touch, the game controller can change the video content output to the touch screen display.

In one embodiment, the touch screen display 420 can be a replacement display such that it replaces the display installed in the EGM during its manufacture. For example, the replacement display can be installed during a retrofit of an EGM. When used as replacement display, the touch screen display 420 can have a resolution that is greater than the native resolution in which the video content output by the game controller is generated. For instance, the touch screen display 420 can have resolution of 1280 by 960 while the native resolution of the content output by the game controller 16 is 640 by 480. When a display technology with a fixed pixel size, such as an LCD, is used as the replacement display, interpolation and/or smoothing can be utilized to scale the content output from the gaming controller to fit the resolution size of the display. These functions can be performed by a controller on the EGM, such as a controller associated with a secondary gaming device, which is installed as part of a retrofit. In another embodiment, one or more of these functions can be performed by a controller associated with the display 420.

As described above, a first controller can be configured to receive sizing, positioning and scaling related commands, which affect video content output to the display 420, such as video content from a plurality of different sources. In one embodiment, a secondary controller is configured to generate these sizing, positioning and scaling related commands and not the game controller. For instance, the secondary controller can be configured to select picture in a picture modes that allows the video content output from game controller to be displayed on different portions of the touch screen display at different resolutions where the native resolution output by the game controller and sent to the touch screen display is constant and is altered after it generated via one or more secondary controllers.

The sizing, scaling and positioning commands can be associated with picture-in-picture (PIP) capability of the display 420. Using the PIP capability, video content can be transmitted from a secondary gaming device and displayed as a PIP mode on the display 420. In one embodiment, the video can be transmitted via a USB interface (see 706, in FIG. 16). Via a secondary gaming device, the PIP capability can be used to output real-time or stored video for the player. The real-time video can be received from a remote source, such as a server located on an internal network (see 107, in FIG. 5) or external network (e.g., the Internet).

In one embodiment, one or more secondary gaming device can control the PIP independently from the game controller. Thus, the game controller may not be aware that the video content that it is outputting is affected by PIP commands issued by the one or more secondary gaming devices or that the one or more secondary gaming devices is sending control commands to the display 420. Thus, the PIP capabilities can be provided in a retrofit situation without modifying the game software executed by the game controller prior to the retrofit.

In another embodiment, the game controller can be configured to transfer or allow control of the display 420 by a secondary gaming device. Thus, the game controller may be aware of the secondary gaming device and configured to communicate with it in some manner. As an example, the game controller can be configured to hand over control to a secondary gaming device to allow it to display a bonus game presentation or a wager-based game presentation on all or a portion of the touch screen display 420. Thus, game controller can engage in bi-directional communications with the secondary gaming device to indicate when the display is available and the secondary gaming device can communicate when it is finished using the display. When the secondary gaming device indicates it has completed displaying the bonus game presentation or outputting some other type of video content, the game controller can reassume control of the display 420. When the game controller controls the display, it may prevent a controller on a secondary gaming device from outputting content to the display 420.

Figure 16:
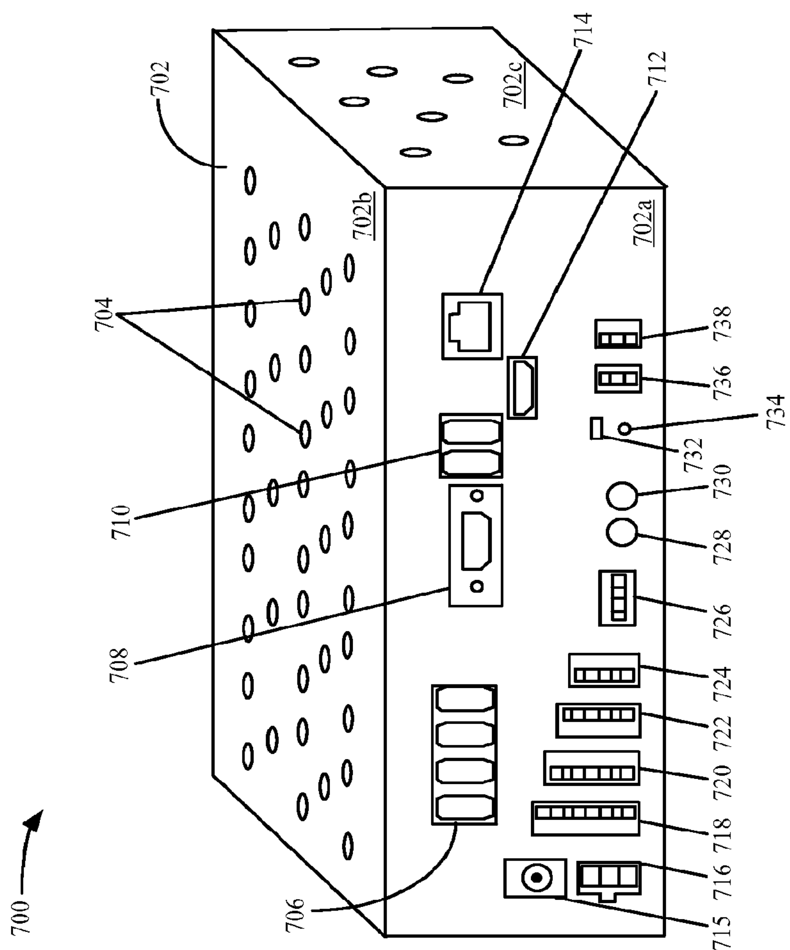
FIG. 16 is a perspective drawing of a secondary gaming device including numerous power and communication interfaces in accordance with the described embodiments.

FIG. 16 is a perspective drawing of a secondary gaming device 700 including numerous power and communication interfaces in accordance with the described embodiments. In particular embodiments, the secondary gaming device 700 can be configured to perform of any combination of the functions described above with respect to the candle controller (e.g., 31). Further, the secondary gaming device can be configured to perform the video scaling, touch screen scaling and other functions of the controller 60 described above with respect to FIGS. 3A and 3B.

The secondary gaming device includes a housing 702. In one embodiment, the housing 702 is box shaped with six planar sides. The housing 702 can be other shapes and the example of a box is provided for the purposes of illustration only. In one embodiment, the length, width and height dimensions of the housing 702 can be about 8 inches (L) by 3.5 inches (W) by 2.5 inches (H) for a volume of 70 cubic inches.

An internal volume of 100 cubic inches or less provides adequate area for the power and data connectors and volume for the internal circuitry coupled to the connectors including a processor and memory. The volume allows for the housing 700 to fit in the excess space in the interior cabinet of a variety of different types of EGMs. In a retrofit installation, the excess space can be a location within the EGM cabinet not occupied by the existing EGM components at the time of installation of device 700. The location and the orientation in which the secondary gaming device 700 is installed in the EGM can vary from EGM to EGM depending on the internal configuration of the EGM.

In one embodiment, all of the power and data connectors can be located on one planar surface of the housing. For example, the housing 702 is box-shaped and all of the connectors are located on surface 702*a*. Thus, no connectors are located on the side opposite 702*a*, side 702*b* and its opposite side and side 702*c* and its opposite side. This feature can simplify the installation process as all the power connectors are accessible and visible at the same time which can be important when installing the device 700 in a cramped interior of an EGM cabinet. In another embodiment, the power and data connectors can be distributed across only two surfaces, such as surface 702*a* and 702*c* for example or between surface 702*a* and its opposite side.

One advantage of locating the power and data connectors on only one or only two surfaces of the housing is that it allows the housing to be mounted in a variety of orientations. For example, for housing 702, one or more of the remaining sides can be used for mounting purposes. For example, an attachment interface can be placed on any of sides 702*b* and its opposite, 702*c* and its opposite and 702*a* and its opposite. The orientation of the device 700 in an installed position can depend on the orientation of one or more surfaces in an interior of an EGM to which one or more sides of device 700 are coupled. For example, the device 700 can be mounted to a horizontal surface, a vertical surface, a combination of both a horizontal and a vertical surfaces or a slanted surface).

In one embodiment, a Velcro-type interface, such as Velcro-type tape with two adhesive sides, can be used to couple one or more sides of housing 702 to one or more surfaces within an EGM cabinet, such an interior surface of the cabinet or a surface associated with some other device within the EGM cabinet. In another embodiment, another type of fastener, such a mounting bracket can be used. With a Velcro-type interface, gaming device 700 can be easily swapped with another device if the device is faulty or needs to be upgraded.

The housing 702 can enclose the connectors, processors and memories. The components, such as the processors can generate heat. The housing 702 can include a number of vents, such as a grill of small holes 704, for cooling purposes. A cooling device, such as a fan may be located within the housing or coupled to an exterior portion of the housing. In another embodiment, the housing can be sealed and cooling mechanisms can be placed on the outside and/or inside of the housing, such as heat sinks with radiators or water cooled systems. Sealing the housing can protect the electronic components from dust and/other contaminants which can cause shorts and limit access to the interior housing, which may be beneficial for security purposes. When vents, such as 704 are used, the vents can be covered with a grill or a mesh to prevent dust intrusion.

In one embodiment, the housing 702 can be formed from two or more pieces. The pieces can be configured lock or snap together or be secured to one another via some other type of fastener. Security sensors can be placed within the housing 702. The security sensors can be configured to detect an access to an interior housing and/or manipulation of any of the internal components, such as a processor and/or memory disposed within the housing 702. A processor associated with the secondary device can monitor the security sensors. In addition, the processor can be configured to monitor security sensors or receive security related data associated with the EGM as is described above with respect to FIG. 15.

The housing 702 can include a number of apertures for power and data connectors. When device 700 is installed in an EGM, such as during a retrofit, new power and data pathways may be established between the device 700 and various other devices within the EGM cabinet using the power and data connectors. In some instances, the power and data pathways may be temporary in that they are only used during the installation process. In other instances, the power and data pathways may be more permanent in that the power and data pathways are utilized when the EGM is available for wager-based game play. The new power and data pathways may be wired or wireless pathways. All or a portion of the power and data connectors in any combination, which vary from EGM to EGM, may be used to establish the new power and data pathways. In one embodiment, the new power and data pathways can be utilized without modifying software executed by the game controller prior to installation of the secondary device 700.

In one embodiment, face 702*a* includes a number of serial data ports. For example, four USB ports 706 and five ports, 718, 720, 722, 724 and 726 which allow serial data communications using other serial communication protocols are provided. Other types of serial ports using different communications protocols can be provided and the secondary device 700 is not limited to a USB protocol. Devices, which can be coupled to these ports in different embodiments, are described in more detail as follows and have been previously described above with respect to the candle device embodiment.

Ports 710 can be used to couple a keyboard and mouse to the secondary gaming device 700. In one embodiment, the keyboard and mouse can be used only during the installation process to install software and configure the secondary gaming device 700. In addition, the video port 708 can be used during the installation process. For example, port 708 can output video associated with a configuration interface generated by device 700.

A number of power related connectors are provided. For example, ports 715 and 716 can be used to receive power, such as a 12 DCV power. A power source, such as an AC power source can be converted to the DC voltage. Other voltages are possible and 12 Volts is provided for illustrative purposes only. The connection format is different for each port. For example, port 715 accepts a round connector while port 716 accepts a rectangular connector. Ports 736 and 738 can be used to supply power to other devices coupled to the ports. In addition, the USB ports 706 can be used to provide power to devices coupled to the secondary gaming device.

The secondary gaming device can include a number of video and audio ports. For example, port 708 is a video port which can be used to output video from the device 700. In one embodiment, port 708 may only be used when device 700 is installed, serviced or verified form regulatory purposes. In one embodiment, the port 708 is a VGA compatible. In other embodiments, different video interfaces can be used, such as DVI or a mini-Display-Port. Port 712 can be used to output video and audio signals. In one embodiment, it is HDMI compatible port. An example of a configuration using port 712 is described below. Port 728 can be used to output audio signals. Port 730 can be used to receive audio signals, such as from a microphone. The USB ports 706 can be used to receive and send audio and video signals.

The secondary device can include a number of network connectors for communicating with remote devices, such as remote servers or portable electronic devices. For example, port 714 can be used to establish a network connection, such as an Ethernet connection. Further, one of the USB ports can be used to couple gaming device 700 to a wireless interface. For example, a radio candle mount, as described above, can be coupled to the secondary gaming device via one of the USB ports 706. The secondary gaming device 700 can be configured to utilize one or both of wireless and wired communication interfaces for network communications.

One or more status related devices can be provided on secondary gaming device 700. For example, a light 732 can be provided which indicates the secondary gaming device is receiving power. In another embodiment, a light (not shown) can be provided which indicates the secondary gaming device is in a ready or operational state. A switch 734 can be provided for resetting or cycling power on the secondary gaming device. A pin can be inserted through an aperture to activate switch 734 and cycle power on the secondary gaming device.

Figure 17:
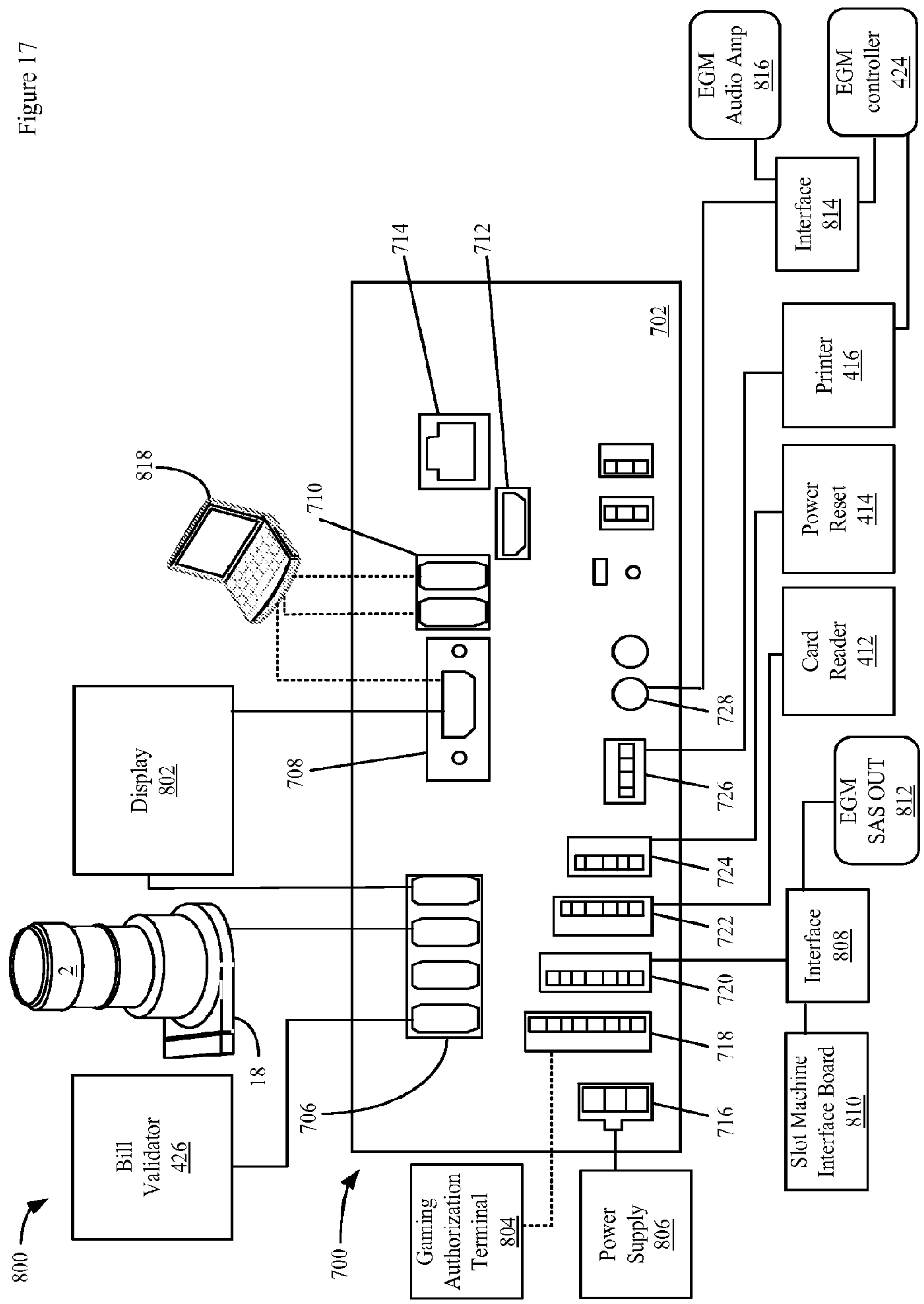
FIG. 17 is a connection diagram of a gaming device coupled to an electronic gaming machine in accordance with the described embodiments.

FIG. 17 is a connection diagram 800 of a secondary gaming device 700 coupled to an EGM. This configuration is provided for purposes of illustration only as different combinations of devices can be coupled to the secondary gaming device. For example, in some embodiments, the secondary gaming device 700 may not be connected to a card reader. In other embodiments, the secondary gaming device can be coupled to a camera (not shown). In yet other embodiments, the secondary gaming device can be connected to a candle device. In other embodiments, it may not be connected to candle device.

A first one of the USB ports 706 is connected to a value input device, which is a bill validator 426 in this example. The bill validator 426 can also be configured to communicate with the EGM controller 424. As described above, the EGM controller 424 can control a play of a wager-based game on the EGM including determining an outcome to the game, which may be a random outcome, and determining an award associated with the determined outcome. In various embodiments, the secondary gaming device 700 and the EGM controller can be configured to both communicate with and/or both control one or more of the devices on the EGM. For example, both the secondary gaming device 700 and the EGM controller can communicate and control a display, a printer or a bill acceptor. In other embodiments, the secondary gaming device or the EGM controller 424 may only communicate with and/or control a particular device. For example, the secondary gaming device can communicate with a wireless interface which is not communicatively coupled to EGM controller or the EGM controller can communicate with a bonus device, such as wheel, which is not communicatively coupled to the secondary gaming device.

In a retrofit, a communication connection can be interposed between a new communication pathway between the EGM controller and another device, such as the bill validator, or the new communication pathway can be added as a separate connection. For example, the EGM controller can communicate with a device, such as the bill validator, via one communication pathway coupled to a first port on the bill validator and the secondary gaming device can communicate with a device, such as the bill validator, via a second communication pathway coupled to a second port separate from the first port. As another example, both the EGM controller and the secondary gaming device can communicate with a device, such the bill validator, via a common port, where a connection was added during the retrofit which allowed the secondary gaming device to share the common port.

In a particular embodiment, the secondary gaming device may be able to interrupt a communication from the bill validator 426 to the EGM controller 424 or from the EGM controller 424 to the bill validator 426 and optionally generate a substitute communication. For example, the bill validator 426 can receive currency or a printed ticket and attempt to send the information to the EGM controller 424. The secondary gaming device 700 can be configured to interrupt the communication to the EGM controller 424 so that it doesn't reach the EGM 424 controller and instead process the communication and send a response to the bill validator. In another embodiment, the secondary gaming device 700 can be configured to route the interrupted communications to one or more remote devices via a network interface associated with the secondary gaming device. In some instances, when a signal is routed to a remote device, the remote device can be configured to generate a substitute signal.

In general, the secondary gaming device 700 can be configured to interrupt communications between two logic devices and optionally generate substitute communications on any communication pathway on which it is interposed between the two logic devices. For example, the secondary gaming device 700 can be interposed on a communication pathway between a card reader and a player tracking controller. After it is interposed, the secondary gaming device can be configured to interrupt a communication from the card reader to the player tracking controller or from the player tracking controller to the card reader. The secondary gaming device can then generate a substitute communication. In one embodiment, the substitute signal can be generated based upon information contained in the interrupted communication. In another example, the secondary gaming device can be interposed between the player tracking controller and the EGM controller.

Also, the secondary gaming device 700 can be configured to route communications between two logic devices to alternate devices. The communication routing can involve changing the destination of communication from its original recipient. For example, a communication sent from a bill validator 426 to the EGM controller 424 can instead be sent to another destination, such that the EGM controller 424 doesn't receive the communication.

In another embodiment, the communication routing can involve cloning all or a portion of a communication and sending it to one or more additional sources. For example, a communication sent from a bill validator 426 to an EGM controller 424 can be cloned such that the EGM controller 424 receives the communication and one or more additional devices receive all or a portion of the communication. The routing and cloning functions can be invisible to the devices which have sent a communication. For example, when the bill validator 426 sends a communication to the EGM controller 424 or vice versa, the bill validator 426 and/or the EGM controller 424 may not know that the secondary gaming device 700 has rerouted or cloned the communication.

In one embodiment, the secondary gaming device 700 may only monitor communications to and/or from the bill validator 426. For example, the secondary gaming device 700 can receive information related to monetary transactions performed on the bill validator 426, such a transaction amount and even an image of a bill or scrip which has been accepted, and data related to the performance of the bill validator, such sensor data and or data from bill validator controller, which can indicate a status of the bill validator. The sensor data and/or data from the bill validator controller may be used to schedule maintenance for the bill validator 426. For example, if the bill validator is rejecting currency or scrip which is above a threshold value, the secondary gaming device can determine maintenance is needed. This decision may also be determined by a remote device, which has received the bill validator information via the secondary gaming device.

In another embodiment, the secondary gaming device 700 can be configured to send data to the bill validator via the connection between the bill validator and the secondary gaming device. For example, the secondary gaming device 700 can be configured to download new firmware to the bill validator. In another example, the secondary gaming device 700 can be configured to send commands to the bill validator, such as command to reboot itself or a command to adjust operation of a sensor on the bill validator. In general, the secondary gaming device 700 can be configured to directly communicate with a controller on any of the devices to which it is connected. The communications can involve sending commands and/or data including software, which affects operation of the device.

A second one of the USB ports 706 is coupled to the radio candle mount 18. Via this communication interface, the secondary gaming device 700 can be configured to send and/or receive wireless communications. Further details of a candle mount 18 are described in co-pending U.S. patent application Ser. No. 14/027,111, by Wells et al., filed Sep. 13, 2013 and titled "Radio Candle Mount," which is incorporated by reference in its entirety and for all purposes.

In one embodiment, the secondary gaming device 700 can be also coupled to a candle device 2, via one of the USB ports. A third one of the USB ports is coupled to a display 802. In various embodiments, the display 802 can be a main display on the EGM on which all or portion of a wager-based game is output, a secondary display on which the EGM controller 424 displays secondary information, such as bonus information, a player tracking display on which a player tracking controller displays information or a separate display, which is controlled by the secondary gaming device, alone or in combination with a remote device. In other embodiments, other devices can be coupled to one of the USB ports 706. For example, a camera or other security device can be coupled to one of the USB devices.

In particular embodiments, one or more of the USB ports can be configured to only connect to a particular type of device. For example, the secondary gaming device 700 can be configured to only recognize the bill validator 426 when it is connected to the first USB port of the four USB ports. If a bill validator 426 is coupled to one of the other three USB ports, the secondary gaming device can be configured not to recognize the bill validator. Further, if another type of device is coupled to the first USB port, the secondary gaming device 700 can be configured not to communicate with the device. In other embodiments, a greater number of USB ports, a lesser number of USB ports or no USB ports can be included on the secondary gaming device.

Typically, part of the USB protocol includes allows different types of devices to use a standard port. For example, a USB compatible keyboard can be plugged into the same port as a USB compatible mouse. Thus, a restriction of a particular USB port to a particular USB compatible device is not usually associated with USB.

Five serial ports, 718, 720, 722, 724 and 726, of different sizes and orientations are disposed beneath the USB ports 706. In one embodiment, each of the non-USB serial ports can be configured to accept a particular type of device. The different ports sizes and orientations can be used to reduce installation mistakes, such as during a retrofit. If all the ports where the same size and the same orientation, then two different devices might be misconnected. For example, a printer 416 could be connected in the card reader port 722 and a card reader 412 could be connected in the printer port 726. The different sizes and/or different orientations (a vertical versus horizontal orientation) helps to ensure the devices are correctly connected. Even though the ports sizes are different, the same communication protocol can be used on all or portion of the non-USB ports. For example, two or more of ports, 718, 720, 722, 724 and 726, can utilize an RS-232 communication protocol.

In the example of FIG. 17, port 718 is a spare port. However, it can also be used to support regulatory functions, such as verifying software installed on the EGM. Thus, in one embodiment, a gaming authorization terminal 804 or other type of device configured to perform regulatory functions can be coupled to the secondary gaming device 700 via port 718. In another embodiment, another device, such as a connection to a button panel or button on the EGM can be established via port 718.

Port 720 is configured to receive slot accounting communications from an EGM controller 424. In the example, an interface 808 is interposed between the EGM SAS out 812 and a slot machine interface board (SMIB) 810. In one embodiment, the interface 808 can have two components—a microcontroller board, and the harnessing. The microcontroller board, which may include proprietary firmware, can be a passive or active device that monitors communication between the EGM and the SAS host controller for the purpose of relaying information to the secondary gaming device.

The SMIB 810, often coupled to a player tracking unit, is used to communicate EGM accounting information to a remote device. In this example, via the interface 808, the secondary gaming device 700 can be configured to receive accounting related information from the EGM controller 424 sent via SAS interface 812 and forward it to a remote device if desired. Further, the secondary gaming device may be able to send certain SAS enabled commands to the EGM controller 424, such as a command to add promotional credits to an EGM or print a promotional ticket. As described above, the secondary gaming device 700 can be configured to interrupt and generate substitute communications on this communication pathway.

SAS is one example of a communication protocol which an EGM controller, such as 424, can use to communicate with a remote device. The Slot Accounting System (SAS) protocol was initially designed to automate slot machine meter reporting and event logging, SAS has evolved over the years to include player tracking, bonusing, ticketing and cashless gaming. SAS can be considered a casino communications standard because of its availability to all manufacturers in the industry.

The Gaming Standards Association (GSA), representing a broad range of gaming industry manufacturers and operators, adopted SAS 6 as a recognized communications standard for the industry in July of 2002. The latest version of the protocol is SAS 6.02, which is fully backward compatible with all previous versions. SAS 6.02 complies with the latest Nevada Gaming Control Board Technical Standards for gaming machine accounting, as well as providing complete multi-game and multi-denomination accounting. In various embodiments, the secondary gaming device can be configured to support different versions of SAS and other gaming specific communication protocols, such as protocols related to slot accounting.

Port 722 is coupled to a card reader 412. The card reader 412 can be an existing card reader or one that is added during the retrofit. A microcontroller tap can be used for an existing card reader, such one on a player tracking unit coupled to an EGM. The microcontroller tap can plug in between the existing card reader and a SAS host controller. A new player card reader, which may be installed during a retrofit, can include a built-in port that directly connects to the secondary gaming device 700.

Typically, a card reader, such as 412, on an EGM communicates with and is controlled by a player tracking controller on the EGM. Via an interface, such as the microcontroller tap to the card reader 412, the secondary gaming device may be able to receive information from inserted cards and perform functions not supported by a player tracking controller.

As an example, most player tracking controllers only recognize magnetic striped cards associated with a player tracking club. Via the interface to the card reader 412, the secondary gaming device 700 may be able to recognize other types of cards, such as a credit and debit card inserted into the card reader. The information read from a credit or debit card might be used to perform a value transaction or merely identify a person which may not have a player tracking card. As described above, the secondary gaming device 700 can be configured to interrupt and generate substitute communications on this communication pathway. For example, when a credit card is inserted in the card reader, communications from the card reader 412 to a player tracking controller may be interrupted or cloned.

Port 724 can be coupled to a power reset device 414. A power reset device 414 can be used to cycle power for one or more devices on the EGM including the EGM controller 424. Additional details of a power reset device are described in U.S. patent application Ser. No. 13/890,285, titled, "REMOTE POWER RESET FEATURE ON A GAMING MACHINE," filed May 9, 2013, by Wells, et al., which is incorporated by reference and for all purposes.

Port 726 is coupled to a printer 416. The secondary gaming device can be configured for real-time remote monitoring of the health of the ticket printer (paper low, paper out, ticket jams, etc.), allowing for quick resolution by floor personnel. In particular embodiments, the secondary gaming device can monitor both Future Logic GEN2 Universal printers (Glendale, Calif.) connected via the second port on the printer and TransAct Epic950 Printers (Hamden, Conn.) connected via TransAct's eServer Port. Other types of printers can be monitored and these are provided for the purposes of illustration only.

Port 728 is coupled to an EGM audio amplifier 816 via interface 814. In this embodiment, the interface is interposed between the EGM controller 424 and the audio amplifier 816. Via the interface, the secondary gaming device 700 can be configured to output audio signals via speakers existing on the EGM. The speakers may also receive audio signals from the EGM controller 424. The audio signals from the secondary gaming device can be mixed with or output separately from the audio signals generated from the EGM controller 424.

A power supply 806 is shown coupled to port 716. In one embodiment, an AC voltage associated with the EGM's power supply can be converted to a DC voltage. The DC voltage can be input via power port 716.

A terminal 818 is shown coupled to ports 708 and 710. In one embodiment, the terminal can support video, a keyboard and a mouse or touchpad. Typically, the terminal may be coupled to ports 708 and 710 during installation, repair or maintenance. In one embodiment, these ports may only be used for these purposes. In other embodiments, the ports can be used to support other devices outside of installation, repair or maintenance. For example, port 708 can be used to output video signals to a display device 802 coupled to the EGM while the EGM is operational for game play.

Figure 18:
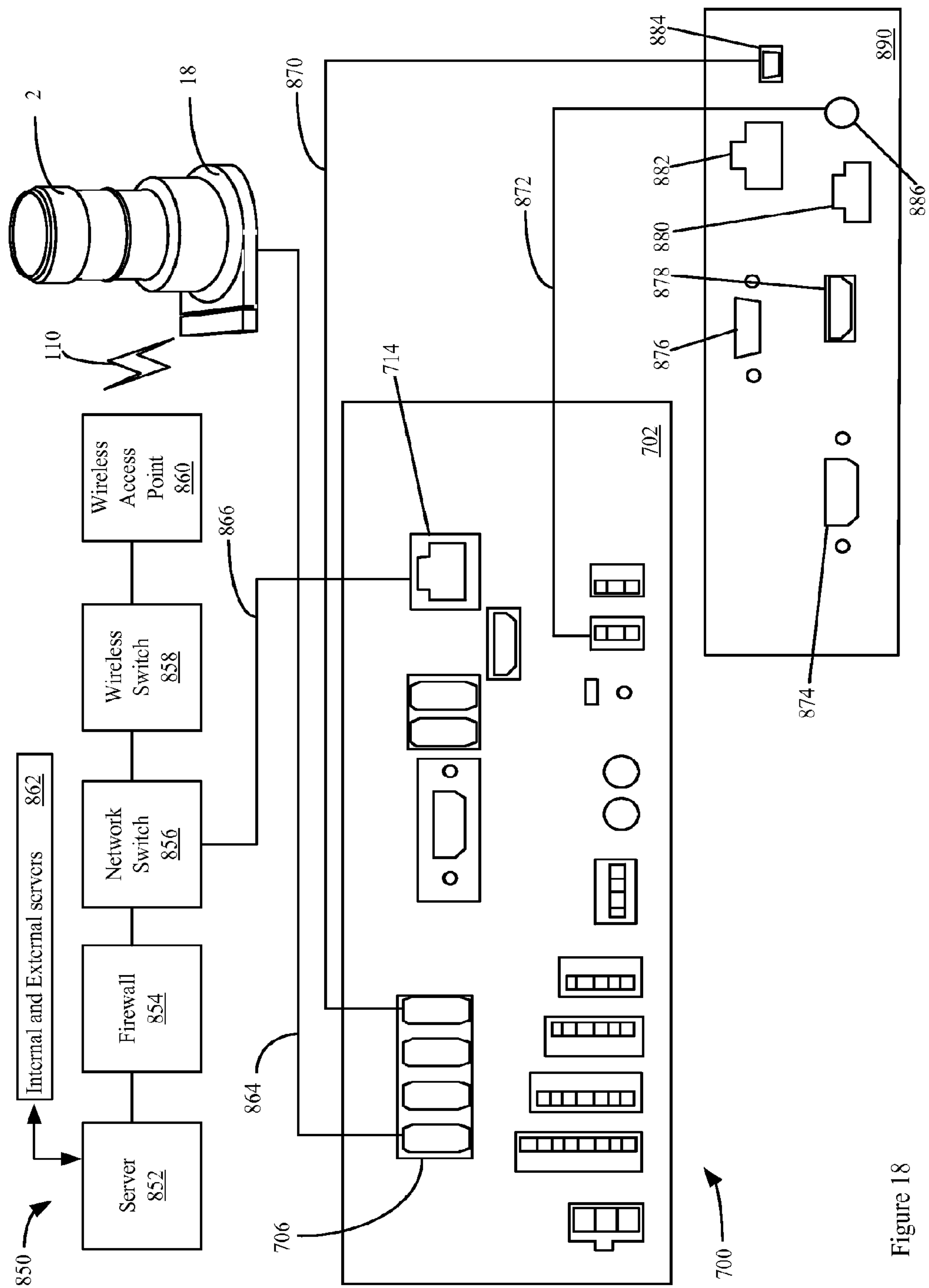
FIG. 18 is a diagram of gaming system configured to provide picture in a picture gaming services on electronic gaming machines in accordance with the described embodiments.

FIG. 18 is a diagram of gaming system configured to provide picture in a picture (PIP) gaming services on EGMs. In FIG. 18, the secondary gaming device 700 is shown connected to a network switch 856 via a wired communication connection 866 from port 714. In addition, via one of the USB ports 706, the radio candle mount 18 can be used to establish wireless communications 110 between the secondary gaming device 700 and a remote server, such as 802. The wireless communications 110 are received via wireless access point 860. In a casino environment, numerous wireless access points can be provided.

The wireless access point 860 is coupled to a wireless switch 858, which is coupled to the network switch 856. Communications from the network switch 856 pass through a firewall 854 to server 852. In one embodiment, server 852 can be used to monitor information from different gaming devices, which reside on numerous different EGMs. Further, the server 852 can be configured to send commands to and provide various services to a plurality of different secondary gaming device. In one embodiment, access to various internal external servers 862 can be provided via server 852.

In a retrofit situation where an EGM is retrofit with a secondary gaming device, the EGM controller can execute software which specifies communications with a first set of servers. EGM software can specify what information is transmitted to each server, what communication channel is to be utilized, what communication protocol is to be utilized and what information can be received. The secondary gaming devices, such as 700, can act as an intermediary device which is configured to receive the communications in the manner proscribed by the EGM hardware and software and respond to the communications as expected by the EGM controller. Thus, the secondary gaming device 700 emulates the external communication and functions expected by the EGM controller on the EGM, i.e., the EGM external device configuration is emulated. The external communications that are emulated can vary from EGM to EGM.

The secondary gaming device 700 can receive communications from an external gaming device and the EGM and modify it in different ways. For example, an upgraded player tracking system may use a communication protocol between an external device and the secondary gaming device which is different than an older communication protocol that the EGM controller utilizes. The secondary gaming device can be configured to convert communications from the EGM controller to be compatible with the new communication protocol and convert communications from an external device to the EGM in the new communication to the communication protocol which the EGM accepts.

The external device configuration of the EGM controller emulated on the secondary gaming device 700 allows the actual external device configuration to be different than the configuration for which the EGM hardware and software is configured. For example, the EGM can include two hardware communication connections and software for communicating in two different protocols with two separate servers. The portion of the secondary gaming device facing the EGM can be configured to communicate with the EGM via the hardware interfaces and software protocols native to the EGM and the EGM controller. However, on the portion of the secondary gaming device facing the external devices. The actual external device configuration may be different than the native EGM configuration. For example, rather than communicating with two separate servers, the secondary gaming device may communicate with a single server using communication protocols different than what the EGM is configured to use.

Ad described above, the secondary gaming device 700 can be used to support picture in picture (PIP) functions on an EGM. In one embodiment, the secondary gaming device 700 can be coupled to another secondary gaming device 890, which supports some of the PIP functions. For example, device 890 can be used to support receiving and modifying EGM controller generated audio, video and touch screen data under control of the secondary gaming device, alone or in combination with a remote server. For example, device 890 can be used to shrink a size of the EGM video data and output it with video data received from the secondary gaming device, such as in the PIP mode described in FIG. 3B.

Further, device 890 can be used to route touches detected from a touch screen on the EGM to the secondary gaming device 700. The touches may correspond to touch screen buttons output in the video data received from the secondary gaming device. In addition, the device 890 can be configured to interpolate touch screen data associated with the EGM video data when the data has been shrunk to a native resolution expected by the EGM controller.

The EGM controller can be configured to respond to or ignore touches from different locations on a touch screen. When the EGM controller video data is scaled, such as shrunk in size, the touch locations which are active change positions on the display. Thus, the interpolation can involve translating touch locations associated with video data with a first resolution to touch locations associated with video data with a second resolution, such as the native resolution of the video data generated by the EGM controller.

In FIG. 18, device 890 is configured to receive power from device 700 via connection 872 to power port 886. The device 700 can be configured to send video data to device 890 via one of the USB ports 706. In this example, connection 870 is used to transfer video data from a USB port to a mini-USB port 884. In an alternate embodiment, port 878, which is an HDMI compatible port, can be used to receive video and/or audio data from device 700.

Ports 876 and 882 can be used to send touch screen data to an EGM controller. Port 876 supports an RS-232C serial format. Ports 882 supports a communication format associated with some IGT machines. Additional ports (not shown) are used to receive touch screen data from a touch screen display in the formats associated with ports 876 and 882. Other touch screen formats are possible. Thus, these examples are provided for the purposes of illustration only.

Port 874 can be used to receive video data generated under control of an EGM controller and sent to a touch screen display. An additional port (not shown) is used to output video data from device 890 to the touch screen display. The video data from device 890 can include only the video content received from the EGM, only the video content received from the device 700 or a combination of the video content received from the EGM and the device 700. For example, the video data from device 700 and the EGM can be combined in a PIP format as described above. In one embodiment, in a retrofit, the video and touch screen data modifications as well as any functions performed by device 700 can be performed without modifying the gaming software existing on and executed by the EGM controller prior to the retrofit.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, flash memory, memory sticks, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of tracking game play of a wager-based game in a gaming system using a virtual mobile loyalty card, the gaming system including an electronic gaming machine and a remote server, the method comprising:

providing the electronic gaming machine including 1) a touch screen display, 2) a game controller, coupled to the touch screen display, configured to output the wager-based game to the touch screen display and receive inputs from the touch screen display; 3) a secondary processor, coupled to the touch screen display, a spoofing device and a remote server, 4) a card reader configured to receive a physical loyalty card and read magnetic striped data from the physical loyalty card and 5) the spoofing device, under control of the secondary processor, operably connected to the card reader, the secondary processor and a patron management system external to the gaming machine;

in the secondary processor, controlling output of optically formatted image data to the touch screen display;

in the secondary processor, controlling output of a touch screen interface configured to receive input of a code to the touch screen display;

in the secondary processor, receiving the code via the touch screen interface;

in the secondary processor, sending the code to the remote server;

in the secondary processor, receiving from the remote server, magnetic striped data, associate with the physical loyalty card;

in the secondary processor, sending, the magnetic striped data, to the spoofing device;

in the secondary processor, commanding the spoofing device to send a signal, using the magnetic striped data received from the secondary processor, to the patron management system indicating that the physical loyalty card is inserted into the card reader without the physical loyalty card being inserted into the card reader;

in the remote server, receiving, from a mobile device, first information associated with the optically formatted image data output to the touch screen display of the electronic gaming machine and second information associated with a mobile loyalty card from a mobile device, in the remote server, sending the code to the mobile device, in the remote server, receiving the code from the secondary processor, in the remote server, using the second information, retrieving the magnetic striped data associated with the physical loyalty card and in the remote server, sending the magnetic striped data to the secondary processor.

2. The method of claim 1, wherein the optically formatted image data is a QR code.

3. The method of claim 1, wherein the secondary processor is communicatively coupled to a printer and/or a bill validator.

4. The method of claim 1, in the secondary processor, sending data identifying the electronic gaming machine to the remote server.

5. The method of claim 1, in the secondary processor, after the physical loyalty card is inserted into the card reader, receiving the magnetic striped data stored on the physical loyalty card which is read by the card reader.

6. The method of claim 5, sending the magnetic striped data to the remote server.

7. The method of claim 1, in the secondary processor, controlling output to the touch screen display a request to enter a mobile telephone number; and sending a text message, via the remote server, to the mobile telephone number with a link for downloading a mobile application associated with the virtual mobile loyalty card.

8. The method of claim 1, in the secondary processor, controlling output, to the touch screen display, of first optically formatted image data which includes a link for downloading a mobile application associated with the virtual mobile loyalty card.

9. The method of claim 1, in the secondary processor, controlling output to the touch screen display a first touch screen interface configured to receive inputs for creating a virtual mobile loyalty card account associated with the virtual mobile loyalty card.

10. The method of claim 9, wherein the first touch screen interface includes instructions for inserting the physical loyalty card into the card reader.

11. The method of claim 10, in response to the physical loyalty card being inserted into the card reader, in the secondary processor, receiving the magnetic striped data read from the physical loyalty card.

12. The method of claim 11, in the secondary processor, sending the magnetic striped data to remote server, which is stored on the remote server as part of the virtual mobile loyalty card account.

13. The method of claim 9, in the secondary processor, receiving image data of a user interacting with the first touch screen interface.

14. The method of claim 13, in the secondary processor, sending the image data to remote server, which is stored on the remote server as part of the virtual mobile loyalty card account.

15. The method of claim 1, in the remote server, receiving, from the mobile device, biometric data wherein the biometric data is used to grant access to a virtual mobile loyalty card account associated with the virtual mobile loyalty card.

16. The method of claim 15, wherein the biometric data include finger print data.

17. The method of claim 1, further comprising, retrofitting the electronic gaming machine with the secondary processor.

18. The method of claim 1, further comprising, retrofitting the electronic gaming machine with the spoofing device.

* * * * *